(12) United States Patent
Claessens et al.

(10) Patent No.: US 12,301,004 B2
(45) Date of Patent: May 13, 2025

(54) SYSTEM FOR RESPONDING TO FREQUENCY FLUCTUATIONS IN AN ENERGY GRID

(71) Applicant: Centrica Business Solutions Belguim N.V., Antwerp (BE)

(72) Inventors: Bert Claessens, Antwerp (BE); Jonas Engels, Antwerp (BE)

(73) Assignee: Centrica Business Solutions Belguim N.V., Antwerp (BE)

( * ) Notice: Subject to any disclaimer, the term of this patent is extended or adjusted under 35 U.S.C. 154(b) by 626 days.

(21) Appl. No.: 17/598,671

(22) PCT Filed: Mar. 24, 2020

(86) PCT No.: PCT/EP2020/058128
§ 371 (c)(1),
(2) Date: Sep. 27, 2021

(87) PCT Pub. No.: WO2020/193533
PCT Pub. Date: Oct. 1, 2020

(65) Prior Publication Data
US 2022/0190599 A1 Jun. 16, 2022

(30) Foreign Application Priority Data
Mar. 26, 2019 (GB) ...................... 1904189

(51) Int. Cl.
*H02J 3/14* (2006.01)
*H02J 3/24* (2006.01)
*H02J 3/38* (2006.01)

(52) U.S. Cl.
CPC ................ *H02J 3/144* (2020.01); *H02J 3/24* (2013.01); *H02J 3/381* (2013.01); *H02J 2203/10* (2020.01)

(58) Field of Classification Search
CPC .... H02J 3/144; H02J 3/24; H02J 3/381; H02J 2203/10; H02J 3/241; H02J 3/46; H02J 3/06; H02J 3/14
(Continued)

(56) References Cited

U.S. PATENT DOCUMENTS

| | | | |
|---|---|---|---|
| 6,338,009 | B1 | 1/2002 | Sato et al. |
| 9,893,529 | B1 | 2/2018 | Miao |

(Continued)

FOREIGN PATENT DOCUMENTS

| | | | |
|---|---|---|---|
| EP | 2863510 | B1 | 10/2015 |
| EP | 2721708 | B1 | 11/2015 |

(Continued)

OTHER PUBLICATIONS

"FCR Manual for BSPs, Requirements and procedures for supply of FCR," Tennent Taking power further, Mar. 15, 2019, V1.2, 29 pages.
(Continued)

*Primary Examiner* — Richard Tan
(74) *Attorney, Agent, or Firm* — Tucker Ellis LLP; Michael G. Craig

(57) ABSTRACT

A method of controlling assets connected to an electricity distribution grid operating at a predetermined grid frequency is disclosed. The assets comprise assets supplying electrical energy to and/or consuming electrical energy from the grid, with at least some of the assets being configurable to adjust energy flow to or from the grid to counteract grid frequency fluctuations. The method includes configuring an aggregate response by a group of assets to fluctuations in the grid frequency, wherein the aggregate response comprises respective adjustments of energy flow between each of the group of assets and the grid. The adjustments are arranged in combination to counteract a fluctuation in grid frequency.

(Continued)

A divergence is detected between a first grid frequency measured in a portion of the grid comprising a first asset of the group of assets and a second grid frequency measured in a portion of the grid comprising a second asset of the group of assets. In response to detecting the divergence, at least one of the first and second assets is reconfigured to alter the energy flow adjustment for that asset. Reconfiguration may involve clustering assets based on grid frequency and reconfiguring aggregated responses for assets within clusters.

29 Claims, 10 Drawing Sheets

(58) Field of Classification Search
USPC .......................................................... 307/38
See application file for complete search history.

(56) References Cited

U.S. PATENT DOCUMENTS

| | | | |
|---|---|---|---|
| 2012/0123602 A1 | 5/2012 | Sun et al. | |
| 2019/0292933 A1* | 9/2019 | Hiroe | F01D 17/06 |
| 2020/0119557 A1 | 4/2020 | Claessens et al. | |

FOREIGN PATENT DOCUMENTS

| | | |
|---|---|---|
| GB | 2493456 A | 2/2013 |
| GB | 2510735 A | 8/2014 |
| GB | 2515358 A | 12/2014 |
| GB | 2552973 A | 2/2018 |
| JP | 2001352678 A | 12/2001 |
| JP | 2005020916 A | 1/2005 |
| JP | 2016530859 A | 9/2016 |
| JP | 2016540472 A | 12/2016 |
| WO | 2013010266 A1 | 1/2013 |
| WO | 2015059544 A2 | 4/2015 |
| WO | 2016007910 A1 | 1/2016 |
| WO | 2016035399 A1 | 3/2016 |
| WO | 2017009789 A1 | 1/2017 |
| WO | 2017207991 A1 | 12/2017 |
| WO | 2018033638 A1 | 2/2018 |

OTHER PUBLICATIONS

Great Britain Combined Search and Examination Report under Sections 17 & 18(3) corresponding to GB Patent Application No. GB1904189.6, dated Sep. 20, 2019, 7 pages.

The International Search Report and The Written Opinion of the International Searching Authority to corresponding to PCT Application. PCT/EP2020/058128, dated Jul. 16, 2020, 15 pages.

"All CE TSOs' proposal for additional properties of FCR in accordance with Article 154(2) of the Commission Regulation (EU) 2017/1485 of Aug. 2, 2017 establishing a guideline on electricity transmission system operation," ENTSOE, Jan. 28, 2019, Belgium, 7 pages.

* cited by examiner

SYSTEM FOR RESPONDING TO FREQUENCY FLUCTUATIONS IN AN ENERGY GRID

CROSS-REFERENCE TO RELATED APPLICATIONS

This application is a national phase application of International Application No PCT/EP2020/058128, filed Mar. 24, 2020, which claims priority to Great Britain Patent Application Serial No. 1904189.6, filed Mar. 26, 2019, all of which are incorporated herein by reference.

BACKGROUND

The present invention relates to systems and methods for controlling assets supplying energy to or consuming energy from an electricity distribution grid in the event of grid frequency fluctuations.

Electricity suppliers and grid operators implement a variety of energy management techniques at industrial sites or residences, as well as in the distribution grid and transmission grid. Grid operators find it increasingly challenging to manage aspects of their respective energy grids such as balancing electricity supply with demand and responding to frequency shifts in the electrical grid.

In general, a grid operator may mandate behaviour of (or provide financial incentives for) energy producers or energy consumers in order to ensure a stable and responsive electrical grid. For example, a grid operator may buy regulation capacity from industrial consumers and/or producers of power. A consumer or producer offering such a service will receive the mandate to reduce or increase their power consumption when required by the grid operator in order to maintain stability and quality of the grid. There may be a specific requirement that a reduction or increase in power consumption must be stable for a relatively long period of time, or that any such reduction or increase occurs rapidly. Importantly, a grid operator desires to manage assets that consume or supply electrical energy (e.g. electrical loads or generators) at the portfolio level rather than at the individual asset level.

A fast response time can be particularly important for an electricity grid operator. A grid operator is expected to keep the frequency of the power offered on the grid stable (typically 60 Hz in the United States and 50 Hz in Europe), but it can be challenging to keep the grid frequency within an allowable margin. For example, if a power plant is shut down unexpectedly, a large amount of power is suddenly unavailable (demand exceeds supply) and the frequency on the grid will decrease. Similarly, the frequency on the grid will drop if large industrial loads come online and supply is slow to meet that demand. If the frequency of the grid decreases, the frequency can be brought to its reference level by reducing power consumption on the grid or by increasing the supply (or a combination of both). However, it can be challenging to mandate a reduction in power consumption from among a diverse collection of industrial or residential consumers. Perhaps more importantly, it can also be very difficult to achieve a reduction in power consumption as quickly as a grid operator seeks to achieve it—typically on the order of seconds (or even faster), rather than on the order of minutes. A centralized management system may not be able to detect the deviation, schedule a reduction in power, and deliver the schedules to the industrial loads reliably in that short amount of time. The reverse can happen as well. When supply is larger than demand, as happens for instance in case of under-forecast of renewable power production, the frequency can rise above its reference level (50 Hz or 60 Hz). This can be offset either by decreasing the power production or by increasing the power consumption (or a combination of both).

Prior art techniques include using a simple binary switch at a load that will switch off the entire load when the switch detects that the frequency of the power has dropped to a certain level (e.g., the load is switched off when the frequency drops to 49.9 Hz). However, this is a static technique in which the switch is an isolated hardware device that is locked into always switching off the load at a particular frequency; such a device might rigidly switch off the load in such a fashion for many months or years without taking other information into account. This technique also works unilaterally, in the sense that it does not allow the local operational managers to refuse requests for power activation based on operational or business constraints. Moreover, this technique is performed at the load level and does not benefit from any portfolio optimization.

More recently, techniques have been developed that utilize portfolio optimization to improve response by using a combination of energy consuming and/or energy producing assets to implement a combined demand response.

WO 2015/059544, the disclosure of which is herein incorporated by reference, describes an energy management system that allows a grid operator to manage a portfolio of energy loads at the aggregate portfolio level, while responding rapidly and reliably to changes in grid characteristics. A hybrid approach is used in which a central site, based upon a mandate by a grid operator to reduce (or increase) power according to frequency deviations within a frequency band, determines the optimal frequency triggers at which each load within a portfolio should reduce (or increase) power. Symbolically, loads are "stacked" within this frequency band in order to optimize the global droop response of the portfolio so that optimal reliable power is delivered to the portfolio in the case of a grid frequency deviation. These triggers (and corresponding individual load power reductions) are periodically dispatched from the central site (in response to changes in the loads' and grid's behaviour) to the individual loads. When a frequency deviation occurs, each load is able to independently (i.e., without interaction with the world outside of the industrial site) and quickly reduce its power consumption according to the triggers and corresponding power reductions it has previously received. Each trigger signals the load to reduce or increase power according to the state of the grid as locally measured. This approach reduces the reliance upon the central site to detect a frequency deviation and then to dispatch power reductions in real time.

However, although aggregation techniques can improve responsiveness to grid frequency fluctuations, problems can arise when there is a frequency deviation between different regions of the grid. While during normal operation the frequency should be substantially homogenous across the grid, and substantial frequency divergences might be rare, they can and do occur in particular circumstances, e.g. failure of part of the grid infrastructure. In that situation different parts of the grid may be operating at different frequencies, a condition commonly referred to as a frequency split. Such a frequency split effectively divides the grid into two (or more) frequency domains (regions), where each frequency domain (region) is operating at a distinct grid frequency.

When aggregation techniques are used to implement demand response at the aggregated portfolio level, the assets involved need not be located close to each other (geographically or in terms of grid topology), although they may be constrained to one transmission system operator (TSO) area. As a result, a group of assets that are being used in an aggregated fashion to cooperatively provide a demand response service, e.g. to correct frequency deviations, may in fact be located in different areas of the grid, operating—after the frequency split—at different grid frequencies. In this situation, if the assets are operating based on centrally coordinated demand response strategies determined on the assumption of a homogenous grid frequency, then those strategies may fail to produce the desired effect, or may even make the situation worse at a particular location where the centrally determined response strategy is inconsistent with the local grid frequency.

SUMMARY

Embodiments of the invention seek to address or at least alleviate this problem and provide improved techniques for dealing with frequency deviations in an electricity distribution grid.

Accordingly, in a first aspect of the invention, there is provided a method of controlling assets connected to an electricity distribution grid operating at a predetermined grid frequency, the assets comprising assets arranged to supply electrical energy to and/or consume electrical energy from the grid, wherein at least some of the assets are configurable to adjust energy flow to or from the grid to counteract grid frequency fluctuations. The method comprises: configuring an aggregate response by a group of assets to fluctuations in the grid frequency, wherein the aggregate response comprises respective adjustments of energy flow between each of the group of assets and the grid, the adjustments arranged in combination to counteract a fluctuation in grid frequency; detecting a divergence between: a first grid frequency measured in a portion of the grid comprising a first asset of the group of assets; and a second grid frequency measured in a portion of the grid comprising a second asset of the group of assets; and in response to detecting the divergence, reconfiguring at least one of the first and second assets to alter the configured energy flow adjustment for that asset.

The term "asset" or "energy asset" preferably refers to a device, machine or other facility (or collection of such entities) arranged to provide energy to or consume energy from the grid. Energy flow encompasses both flow to the grid from an asset (energy supply into the grid) and flow from the grid to an asset (energy consumption from the grid). Typically, (electrical) energy flow may be measured, processed and/or controlled in terms of electrical power (e.g. expressed in a suitable unit such as Watt). An energy flow adjustment may thus comprise a power adjustment (e.g. an increase/decrease in power consumption or supply).

The predetermined grid frequency is preferably the standard, expected operating AC frequency for electricity transmitted on the gird, also referred to herein as the nominal or reference frequency for the grid. However, it will be understood that the actual grid frequency can vary from that predetermined nominal frequency moment-to-moment and across different locations of the grid. Furthermore, the predetermined frequency itself can be varied (from the nominal reference values e.g. 50 Hz/60 Hz in Europe/US) by grid operators based on operational requirements.

Prior to detection of the divergence (at a first time), the group of assets may operate based on the originally configured aggregate response (performing energy flow adjustment based on changes in grid frequency in accordance with the originally configured response), with one or more assets in the group then operating based on the reconfigured response (at a second time) after detection of the divergence and reconfiguration (performing energy flow adjustment based on changes in grid frequency in accordance with the reconfigured response).

The reconfiguring step may comprise configuring one or more (or each) of the group of assets to reduce (or increase) the magnitude of their respective energy flow adjustments (e.g. temporarily, while the frequency split persists). Alternatively, the reconfiguring step may comprise configuring one or more (or each) of the group of assets to cease (or suspend) providing its configured energy flow adjustment (e.g. while the frequency divergence persists). Thus, altering a configured energy flow adjustment may include not performing the configured energy flow adjustment, e.g. until the grid frequency stabilises.

The first grid frequency may be a local grid frequency for the first asset, e.g. measured at or near the first asset; and the second grid frequency may be a local grid frequency for the second asset, e.g. measured at or near the second asset.

Where reference is made herein to a local grid frequency associated with an asset (or other system element), this may refer to the grid frequency as measured by or at the asset, or at a grid location near the asset (geographically or topologically). For example a local grid frequency may be a frequency of the grid at or below the grid connection point of the asset (the location where the asset connects to the grid). For example, the local grid frequency may be any grid frequency as measured within 1 km, preferably within 100 m or even within 10 m of the asset (either in terms of a direct-line geographical distance or connection length). An asset may include or be connected to a respective frequency sensor for sensing the local grid frequency at or in the vicinity of the asset, typically at (or below) the grid connection point of the site on which the asset is located.

The method may comprise, for a given one of the group of assets configured to implement a given energy flow adjustment, determining a local grid frequency associated with the given asset, evaluating an expected effect of the given energy flow adjustment on the local grid frequency, and ceasing or altering provision of the given energy flow adjustment in dependence on the evaluation.

Preferably, the method comprises ceasing (or modifying) provision of the given energy flow adjustment in response to determining that the energy flow adjustment would exacerbate the detected divergence in grid frequency (e.g. by increasing the difference between the measured frequencies). Alternatively or additionally, the method may comprising ceasing (or modifying) provision of the given energy flow adjustment in response to determining that the energy flow adjustment would cause or exacerbate a deviation of the local grid frequency from the predetermined grid frequency, optionally in response to determining that: the energy flow adjustment would lower the local grid frequency and the local grid frequency is already (at or) below the predetermined grid frequency; or the energy flow adjustment would raise the local grid frequency and the local grid frequency is already (at or) above the predetermined grid frequency.

The method may comprise ceasing (or modifying) provision of the given energy flow adjustment in response to determining that the energy flow adjustment would cause an adjustment of the local grid frequency that exceeds a required correction of the local grid frequency, optionally by a threshold margin.

Instead of ceasing energy flow adjustment, a level of energy flow adjustment may be modified, e.g. to change a configured increase or decrease in energy flow.

Preferably, the method comprises reverting configuration of the assets to the configured aggregate response in response to detecting that the divergence in frequency has ceased or that the magnitude of the divergence has fallen below a threshold.

In an embodiment, the aggregate response is configured based on applying an aggregation algorithm to a pool of assets, the method comprising, in response to detecting the divergence in grid frequencies: segmenting the asset pool into a plurality of asset clusters in dependence on respective grid frequencies measured for respective assets of the pool; and for each asset cluster, applying the aggregation algorithm to assets within the cluster to configure one or more aggregate responses involving only assets within the cluster.

In a further aspect of the invention (which may be combined with the first asset), there is provided a method of controlling a pool of assets connected to an electricity distribution grid operating at a predetermined grid frequency, the assets comprising assets arranged to supply electrical energy to and/or consume electrical energy from the grid, wherein at least some of the assets are configurable to adjust energy flow to or from the grid to counteract grid frequency fluctuations. The method comprises applying an aggregation algorithm to the assets in the pool to configure one or more first aggregate responses to fluctuations in the grid frequency, wherein an (or each) aggregate response comprises respective adjustments of energy flow between each of a selected group of assets and the grid, the adjustments arranged in combination to counteract a fluctuation in grid frequency; controlling assets in the pool in accordance with the configured first aggregate responses during a first time; detecting a divergence between first and second grid frequencies measured at different locations of the grid; and in response to detecting the divergence: segmenting the asset pool into a plurality of asset clusters in dependence on respective grid frequencies measured for respective assets of the pool; and for each asset cluster, applying the aggregation algorithm to assets within the cluster to configure one or more second aggregate responses involving only assets within the cluster. The method further comprises controlling assets in each asset cluster in accordance with the respective configured second aggregate responses (and preferably not in accordance with the first aggregate responses) during a second time. The following optional features may be applied to either of the above aspects of the invention.

The first and second grid frequencies may be grid frequencies associated with (e.g. local grid frequencies for) respective assets in a group of assets configured to provide an aggregate response.

Segmenting the asset pool into a plurality of asset clusters in dependence on respective grid frequencies may comprise assigning assets to clusters based on their respective grid frequencies. This may include, for each of a plurality assets in the pool, determining a local grid frequency for the asset; and assigning each of the plurality of assets to an asset cluster in dependency on its local grid frequency.

The method may comprise segmenting (clustering) the assets by one or more of: assigning assets with similar local grid frequencies to the same cluster; assigning assets having local grid frequencies within a defined range of each other and/or of a reference frequency (for the cluster) to the same cluster; assigning assets to clusters such that assets within a cluster have grid frequencies closer to each other than to the grid frequencies of assets in other clusters. The segmenting is preferably performed using a clustering algorithm, optionally based on k-means clustering.

After segmentation into asset clusters, aggregation occurs within clusters, so that aggregated responses involving assets from different clusters (e.g. corresponding to different frequencies or frequency ranges) are preferably no longer performed.

The step of detecting a frequency divergence may be performed by at least one of the (pool of) assets, preferably by one of the group of assets configured to provide an aggregate response. Preferably, the detecting step is performed by a given one of the group of assets based on one or both of: a local grid frequency measured at the given one of the assets; and a grid frequency measurement received at the given asset from another one of the group of assets.

Alternatively, the detecting may be performed by a central controller, optionally based on grid frequency measurements obtained from assets or based on a central grid frequency measurement, optionally measured locally to the controller. A central grid frequency measurement may e.g. correspond to a grid frequency measurement at a location in the grid not associated with any of the assets being controlled.

The first and second grid frequencies may, for example be measured as a single measurement at a particular time or as a representative value obtained from frequency data over a time window, for example an average over a time window (e.g. the last N seconds with regard to a measurement time). Thus the terms "first grid frequency" and "second grid frequency", and other references to frequency measurements, encompass any feature value extracted from frequency data that is representative of the grid frequency at a particular location/time.

Preferably, detecting a divergence comprises one or both of: detecting a difference between the first grid frequency and the second grid frequency, preferably such that the difference exceeds a threshold difference; and detecting one of the first and second grid frequencies falling below the predetermined grid frequency, optionally by at least a predetermined threshold amount and detecting the other of the first and second grid frequencies exceeding the predetermined grid frequency, optionally by at least a predetermined threshold amount. A divergence may be detected based on either one, or alternatively both of, the above conditions.

Assets configured to provide an aggregate response may be configured to provide different but complementary power responses (energy flow adjustments) in order to achieve a predetermined combined response (adjustment) arranged to counteract the frequency fluctuation.

Preferably, the configuring step comprises identifying two or more assets having complementary power response characteristics and selecting the identified assets to provide the aggregated response.

Assets configured to provide an aggregate response may comprise assets having different response characteristics for responding to frequency fluctuations by adjusting energy flow, the different response characteristics optionally comprising one or more of: different power draw or power supply capabilities; different capabilities for increasing or reducing power (energy flow) responsive to frequency fluctuations; different response times for achieving an energy flow adjustment; different ramp rates for an energy flow adjustment; different time periods during which the assets are able to provide an energy flow adjustment; different asset types, optionally including: a discrete asset type configurable to selectively operate in one of a plurality of discrete states including an off state in which no power is provided or consumed and one or more active states each providing a respective predetermined power supply or consumption level and; a continuous asset type configurable to provide a continuously variable level of power supply or consumption, optionally linearly variable with respect to a frequency deviation to be corrected.

Configuration of one or more aggregate responses and/or segmentation into asset clusters may be performed: by a central controller, or by one or more of the group of assets, optionally wherein configuration of one or more aggregate responses is performed cooperatively by assets in the group of assets in response to exchanging data between the assets, the exchanged data preferably comprising operating models of the assets.

Preferably, configuration of one or more aggregate responses comprises negotiation between assets to determine an asset group suitable for providing an aggregate response, and configuring an aggregate response by the assets of the asset group based on information exchanged between the assets of the group. The method may comprise exchanging grid frequency information between assets, the negotiation performed in dependence on the grid frequency information. Assets having different/diverging grid frequencies from each other, optionally that differ beyond a threshold difference, are preferably configured not to form an asset group for providing an aggregate response.

The method may comprise ceasing or altering cooperation between assets in a group and/or triggering renegotiation of asset groups in response to detection of a grid frequency divergence in the grid or between assets of a group. Ceasing or altering cooperation may involve ceasing or altering the aggregate response by the assets of the group (or particular contributions to the aggregate response by one or more assets of the group).

Note that the term divergence as used herein may refer to a divergence or difference between quantities that exceeds some threshold (where the threshold e.g. defines a tolerance before a difference in frequencies is determined to represent actual meaningful divergence, rather than e.g. minor insignificant fluctuations or measurement errors).

The aggregate response may be configured by a central controller substantially in real-time responsive to grid frequency measurements received at the central controller, for example by sending power set points to assets designed in aggregate to counteract frequency fluctuations.

Alternatively, the aggregate response may be configured in advance of responding to frequency fluctuations and/or the frequency divergence by configuring each asset in the group with control parameters specifying a respective required response, preferably by a central controller. Each asset in the group may perform energy flow adjustment in accordance with the pre-configured response autonomously after configuration in response to (locally) detecting frequency fluctuations, preferably based on a local grid frequency measured at or locally to the asset, optionally wherein the configured response comprises a response function specifying an energy flow adjustment in dependence on a measured frequency/frequency variation.

In a further aspect of the invention, which may be combined with any of the above aspects, there is provided a method of correcting a grid frequency imbalance in an electricity supply grid, comprising: configuring an aggregate response by a group of energy assets to fluctuations in the grid frequency, wherein the aggregate response comprises respective adjustments of energy flow between each of the group of assets and the grid, the adjustments arranged in combination to counteract a fluctuation in grid frequency; detecting a divergence between: a first grid frequency measured in a portion of the grid comprising a first asset of the group of assets; and a second grid frequency measured in a portion of the grid comprising a second asset of the group of assets; and in response to detecting the divergence, reconfiguring at least one of the first and second assets to alter the configured energy flow adjustment for that asset. The method may comprise the further steps or features of any method set out above.

In a further aspect of the invention, there is provided a control device, asset controller or system having means, optionally in the form of one or more processors with associated memory, for performing any method as set out herein.

In a further aspect, the invention provides a control system comprising: at least one processor; at least first and second grid frequency sensors for sensing respective first and second transmission frequencies of electricity at different locations of an electricity distribution grid; and a control interface for controlling an energy supplying or energy consuming asset connected to the electricity distribution grid. The at least one processor is arranged to: control (e.g. at a first time) the asset to counteract fluctuations in grid frequency by altering energy flow between the asset and the gird; detect (e.g. after the first time) a divergence between a first grid frequency measurement received from (or derived from frequency data received from) the first frequency sensor and a second grid frequency measurement received from (or derived from frequency data received from) the second frequency sensor; and in response to detecting the divergence, altering or suspending control of the asset to counteract fluctuations in grid frequency (e.g. during a second time). The system may be adapted to perform any method as set out herein. For example, the system may further comprise data storage storing software code for performing any method as previously set out and/or the at least one processor may be configured to perform any method as previously set out.

In a further aspect, the invention provides a (tangible) computer-readable medium comprising software code adapted, when executed on one or more data processing devices, to perform any method as set out herein.

Any feature in one aspect of the invention may be applied to other aspects of the invention, in any appropriate combination. In particular, method aspects may be applied to apparatus and computer program aspects, and vice versa.

Furthermore, features implemented in hardware may generally be implemented in software, and vice versa. Any reference to software and hardware features herein should be construed accordingly.

DESCRIPTION OF DRAWINGS

Preferred features of the present invention will now be described, purely by way of example, with reference to the accompanying drawings, in which:—

DETAILED DESCRIPTION

Figure 1A:
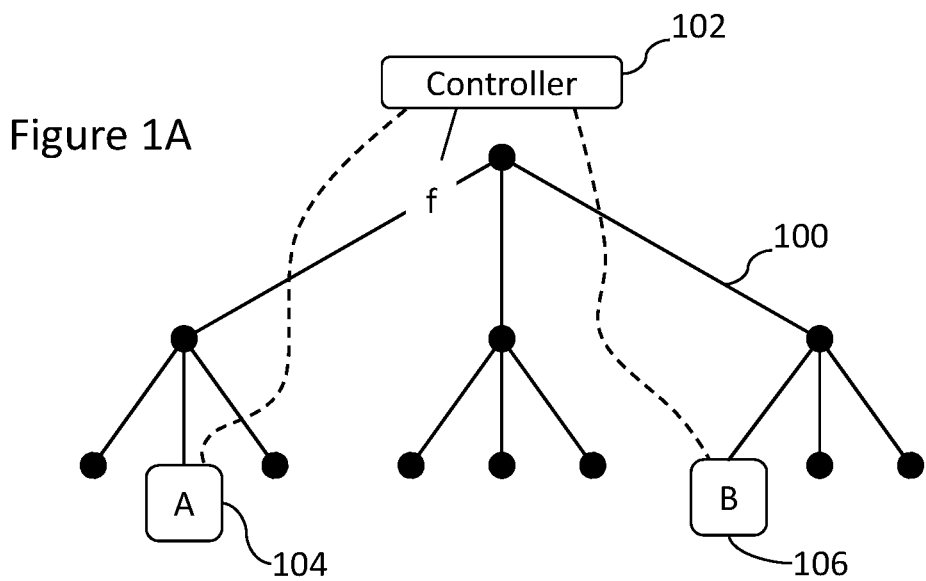
FIGS. 1A-1C illustrate approaches to controlling power assets in an electricity distribution grid, including a centralized real-time control approach (FIG. 1A), a hybrid control approach (FIG. 1B), and a distributed self-organising control approach (FIG. 1C)

Adjustment of power flow (supply or consumption) between an asset and the transmission grid is also referred to as demand response. Where demand response is performed in order to affect grid frequency, for example to respond to and counteract fluctuations of the transmission frequency on the grid, this is also referred to herein as frequency control response.

Note that the provision of operating reserves to counter frequency fluctuations is also known as frequency containment reserve (FCR); in contrast, the term "frequency control response" as used here refers to the control actions that exploit that reserve by modifying power supply/consumption of assets.

Fluctuations in the AC (alternating current) transmission frequency on an electricity distribution/transmission grid can be countered by adjusting power consumption from the grid or power supply into the grid. Specifically, an increase in grid frequency above the standard expected value (e.g. 50 Hz in Europe), also referred to herein as the reference or nominal frequency value, can be countered by increasing consumption or reducing supply, whilst a decrease in grid frequency can be countered by decreasing consumption or increasing supply.

In some cases providers that have suitable energy consuming or energy supplying assets connected to the grid can contract with the grid operator (e.g. a Transmission System Operator or TSO) to provide demand response by adjusting supply or consumption of one or more assets to counter a frequency fluctuation. An energy consuming asset may e.g. be an industrial load such as a factory or machine, an electrical vehicle charging point, a domestic electricity supply point or domestic load, or the like. An energy providing asset may, for example, be a generator (e.g. a petrol generator, wind turbine, solar panel etc.) or an energy storage device such as a battery. Multiple individual consuming and/or supplying devices may operate together as a single asset (e.g. turbines in a windfarm, various machines and systems in a factory). In some cases, an asset may be able to both supply energy to, and consume energy from the grid (e.g. a factory with onsite generator consuming excess demand from the grid and supplying excess generating capacity to the grid at different times, or a battery able to store power drawn from the grid and supply the stored power back to the grid at a later time).

Frequency control generally requires a provider to provide a power output that responds linearly with the frequency deviation from second to second. This can be done at asset level, or at pool level using an aggregation technology. The frequency control service needs to be provided within the constraints of the assets participating in the service.

When providing the service at pool level, the system can leverage the fact that a combination of assets can provide a better response relative to the sum of all the individual responses. Examples include:

Assets each configured to respond to deviations in different parts of the frequency spectrum. For example, a first asset may respond by adjusting its output when the frequency falls in a first frequency band, whilst a second asset may respond in a second frequency band. The assets may work cumulatively, e.g. as the frequency deviates further from the nominal value, additional assets activate their frequency control response.

Fast assets compensating for slow assets not able to meet the relevant ramp constraints. For example, a battery may be able to respond quickly (but may have limited output capacity), whilst a generator may take longer to start up and reach the required output level, but may then have higher output capacity. In such a situation a fast asset may be configured to respond during an initial period while a second, slower asset, ramps up its output. The response speed of a slow asset may be characterised by a delay in responding and/or by a slow ramp rate.

Continuous assets compensating for the discrete behaviour of discrete assets, for example binary assets. A binary asset is an asset which is either on or off—i.e. it supplies (or consumes) at a fixed level when active (on), and supplies (or consumes) nothing when inactive (off). Other discrete assets may provide multiple distinct power levels (in addition to an off state). A continuous asset is an asset that is able to vary its supply output or consumption gradually (e.g. linearly) in response to a control signal and/or in response to the required frequency adjustment or locally measured frequency deviation. Thus, in one example, a continuous asset may be controlled to make up for any shortfall in the response (e.g. power output) delivered by a discrete asset.

Assets compensating for each other when one or the other becomes partially or completely unavailable. For example, some assets may only be available to perform a demand response during particular time windows (e.g. a solar generator only being available during the day and depending on weather; an industrial generator only available when not in use to support an industrial facility).

In a concrete example of aggregated frequency control response, a fast energy device such as a battery (typically energy constrained) and a slow energy load such as an industrial oven (typically not energy constrained) are both used to respond to frequency deviations. Typically, such a slow industrial load cannot fully provide frequency control service compliant with the requirements set forth by the TSO and it needs a partner, such as a battery, that can compensate for its low ramp rate. In exchange, the slow load compensates for the throughput (number of cycles) and limited energy content of the battery.

A typical aim when aggregating assets is generally to provide a response that is as linear as possible. Thus efficient aggregation can be viewed as a combinatorial optimisation problem.

The way in which aggregation of assets is achieved depends on the approach used for controlling and coordinating assets in the grid. A number of control approaches might be considered, some of which are illustrated in FIGS. 1A-1C.

Figure 1B:
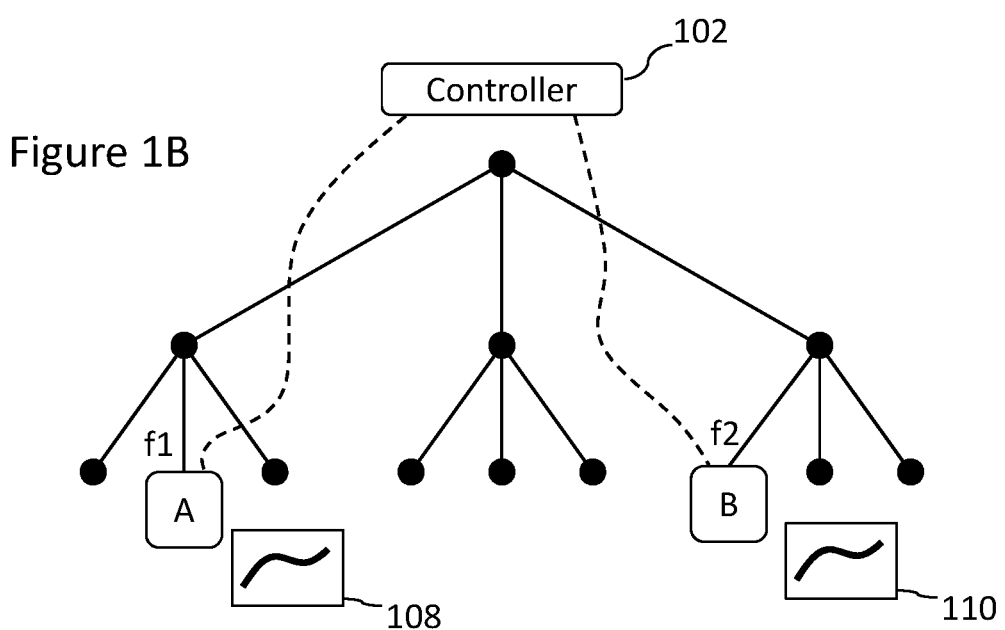
Figure 1C:
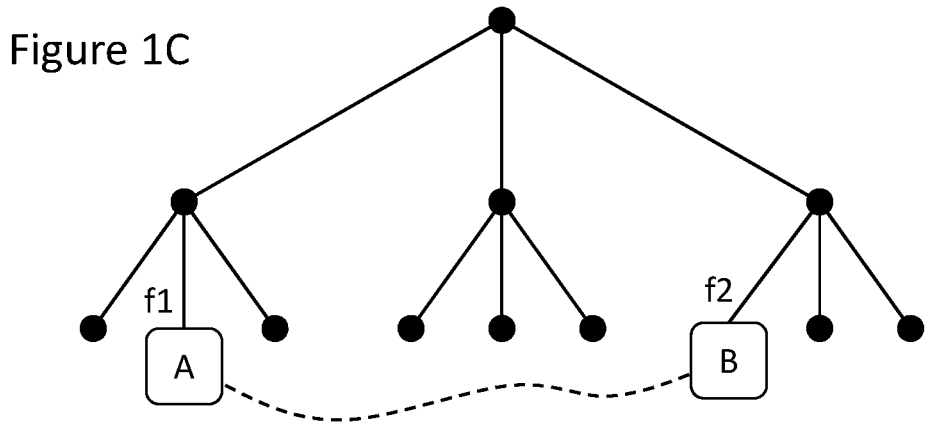

FIG. 1A illustrates a real-time centralised control approach using external set point control. In this approach, power set points are calculated at a position remote from (e.g. outside the geographical perimeter of) the asset. In an example, a battery may provide frequency control response where the set points are calculated at a distant server or at a different asset. In example shown in FIG. 1A, a controller 102 performs centralized control by sending control signals from the central controller (e.g. a server) to all or some of the assets connected to electricity distribution grid 100. In this example, two assets "A" 104 and "B" 106 within grid 100 are depicted as receiving control data from central controller 102. The control data determines the power input/output level required from the asset (the "set point" e.g. measured in MW) and may be specified in absolute terms or in relative terms as in increase or decrease in a current power level. As a result, the set point for the asset (e.g. a battery) is not defined locally to the asset (where "locally" may e.g. mean below the grid connection point of the asset).

The controller performs real-time control (e.g. updating set points at a particular update frequency and/or in response to changes in measured grid frequency). The control data may be based on a single centrally measured grid frequency (shown as "f" in the Figures), for example measured locally to the controller or at some other central location, on the assumption that the frequency is substantially the same across the grid. Alternatively an asset could send its frequency measurement upstream towards the controller calculating the set point, with the controller computing the set point and sending it back to the asset. While a central controller is shown, in practice the controller could be located anywhere; for example a particular asset may host a computing node for implementing the control function and provide control data to other assets.

The controller may control all assets or only a subset depending on requirements. The total set of available assets considered are generally those available for performing demand response and/or frequency control response (referred to as the asset pool). These may, for example, include assets provided by providers having agreements to implement demand control with the grid operator and/or assets provided by the grid operator themselves. The grid will typically contain many more assets not capable of or available for demand control.

The central controller may apply asset aggregation as needed, as described previously, e.g. configuring a fast and slow asset in real-time based on the measured grid frequency to provide complementary frequency control responses.

FIG. 1B illustrates a hybrid control approach, as described further in previously mentioned patent publication WO 2015/059544.

In this approach, the central controller 102 receives contract terms from the grid operator defining a particular portfolio response function that defines the amount of flexible power to be provided as a function of a signal that can be measured locally on the grid (e.g. a frequency band, a response time, and how much power the overall portfolio of loads should shed should the frequency drop to the lowest point of that band). Based upon those terms, the central unit calculates a set of local control parameters for each asset in the portfolio used to configure the processing unit of each asset. These control parameters describe a local response function for an asset that defines the amount of power to be provided (or similarly consumed) by each of the individual assets as a response to a locally measured change in the grid frequency. The configured response may, for example, indicate a frequency range during which an asset should provide a response and/or the level of response to be provided.

The control parameters are sent to each asset and each asset is then able to manage its power in real time based upon a frequency deviation that it detects locally. Thus, the grid operator does not control the loads in real time as in the centralized control example above. A typical example of such a local response function describes a linear relation between the grid frequency deviation and the amount of provided flexible power (though non-linear response functions are also possible, e.g. a simple binary asset providing a simple on/off response based on a frequency threshold).

In the FIG. 1B example, assets A and B are configured ahead of time with a respective response function 108, 110. Each asset then implements the pre-configured response locally based on the locally measured grid frequency (f1, f2) and the respective response function. For example, each asset detects the current grid frequency and its own power consumption; if the frequency at the asset reaches the asset's trigger point (or is within its configured frequency sub-band), a frequency control response is activated and the asset immediately and independently uses its response function to alter its power consumption/supply.

The configured response function may be updated from time to time as needed by the central controller.

As described previously, the central controller may coordinate responses by different assets and apply asset aggregation as needed. For example, assets may be configured based on their respective capabilities to respond within different frequency bands (individually or cumulatively), such that the combined response achieves the desired (close to) linear response to the frequency deviation. Furthermore, complementary assets (e.g. fast and slow assets) may be configured to use complementary response functions, so that the required aggregate response is achieved, without the individual assets necessarily being aware of each other's frequency control response contribution.

FIG. 1C illustrates a distributed self-organising control approach. In this approach, assets communicate directly with each other via a communications network and exchange information about their respective capabilities, e.g. in the form of an operating model describing an asset's response characteristics (e.g. whether an asset is a binary or continuous asset, power output/consumption capabilities, ramp rate etc.) The exchanged models allow an asset to know how another asset will respond to frequency changes (e.g. whether an asset has a slow response).

The assets then determine and negotiate appropriate aggregation groups autonomously based on the exchanged information (e.g. pairing a fast and a slow asset having complementary demand response capabilities into an aggregation group). Each asset can then perform real-time control based on its local measured grid frequency, taking into account the expected response of the other aggregated asset(s) in the group to a frequency deviation based on the exchanged models.

Exchanging models between assets obviates the necessity for a central entity to directly control the loads and sources, and the need for exchanging real-time data between loads/sources, thus providing resilience against communication failure or information loss.

Aggregated groups of assets (loads/energy sources) are formed through peer-to-peer interactions and based upon the particular demand-response service to be provided. Assets exchange models with one another, and, after executing a model to determine what a potential partner can provide with respect to the particular demand response service, the receiving asset decides whether or not to form an aggregation group with the potential partner. Aggregated groups may also be formed based upon historical data that is learned over the course of time with other loads and sources. An asset in an aggregation group may then depend upon the model of a partner asset in a group in order to calculate its own control policy.

The process involves a negotiation phase, during which assets communicate amongst themselves in order to form one or more aggregation groups. In this step, an asset is generally looking for another asset or assets with which it can cooperate in order to provide an improved frequency control response. Advantageously, communication between the devices is peer-to-peer and does not need to go through a central entity, thus providing resiliency against communication failure.

The model of an asset can thus be used in the decision making and control policy of the other asset. During operation, each asset follows its own local control policy taking into account the model or models received from other devices with which it has agreed to form an aggregation group, resulting in a coordinated, combined response to frequency fluctuations in the grid.

Communications and Control

In the above control arrangements, assets may communicate with each other via any suitable communications means, including wired and/or wireless networks, using any appropriate communications technology and media, including e.g. narrow-band IoT (Internet of Things), ADSL, fibre networks, 4G or other cellular, or Ethernet. Networks may encompass private networks and dedicated connections, as well as public networks such as the Internet. Communication with and between the energy assets may be performed via and/or under control of a central entity such as the central controller, or by using peer-to-peer communication directly between assets.

In the various approaches described above, assets are discussed as providing processing functions (e.g. implementing frequency control response in response to centralised real-time control as per FIG. 1A, monitoring local frequency and implementing frequency control response using a preconfigured response function stored at the asset as per FIG. 1B, or peer-to-peer negotiation and model-based control as per FIG. 1C). Such processing functions may be implemented using a device agent, which is software that executes on local computing hardware in close proximity to the asset to be controlled. In one example, this local controller may comprise an embedded controller integrated into the asset. In another example a locally connected controller may be provided. Such a controller may also independently control multiple assets, e.g. via separate device agents running on the controller. For example, a set of batteries could be controlled by a single network-connected control computer, maintaining separate control parameters (e.g. response functions) and/or device agents for each. In the FIG. 1C scenario, the device agent implements the peer-to-peer negotiation, frequency data broadcast etc. The device agent may execute upon a general-purpose computer or on specialized computing hardware, for example using a "Flex-Tract" controller available from REstore N.V. of Antwerp, Belgium. Thus, where an asset is referenced herein this may generally be taken to include the energy supply or energy consuming device(s) themselves together with any integrated or associated control hardware.

External grid sensors connect to the electrical grid and sense variables such as grid frequency, voltage or power quality, and send this information to the device agent on the local computing hardware. The local controller is also connected to the communications network for communication with other assets and/or a central controller (if used).

While FIGS. 1A-1C illustrate various possible control schemes, any other suitable control schemes may be used in embodiments of the invention.

Adapting Asset Aggregation in the Event of Frequency Split

Aggregation techniques as described above can typically provide a good service when the frequency is nearly the same at all assets in the pool. However, as discussed previously, problems can arise in the case of frequency divergences, such as a sudden de-synchronization of the grid, resulting in different frequencies in different regions of the grid. In such a scenario, aggregation as described above can result in individual assets working against the local frequency.

Embodiments of the invention therefore provide control schemes for reducing the negative impact aggregation can have on the grid in case of a frequency split. Proposed techniques aim to provide approaches suitable for various different aggregation schemes, and which either do not make the situation worse in the event of a frequency split, or even improve the situation.

For example, in the external real-time control approach in which set points are communicated to an asset from a remote controller (e.g. FIG. 1A), or the hybrid approach in which assets act autonomously based on a centrally determined control policy (FIG. 1B), a frequency split may not cause a problem if the set points or control policies sent to the battery are agnostic of what any other assets in the pool are doing. However, when the set points or control policies are not agnostic of the performance of other assets in the pool, issues can arise. In a concrete example, a battery asset is configured to compensate for another asset not being available, limited to binary (on/off) operation or too slow (low ramp rate). If the frequency deviation at the locations of the respective assets is in the opposite direction and the battery uses either its own local frequency measurement or the one from a central location or from the other asset, this can actually make the situation at the location of the battery worse. Similarly, where assets operate using a distributed self-organisation approach (FIG. 1C) the control policies implemented by the assets are typically based on an assumption of homogeneous grid frequency and thus can produce similar results in the case of frequency split with an asset potentially acting in a way detrimental to the situation.

Figure 2A:
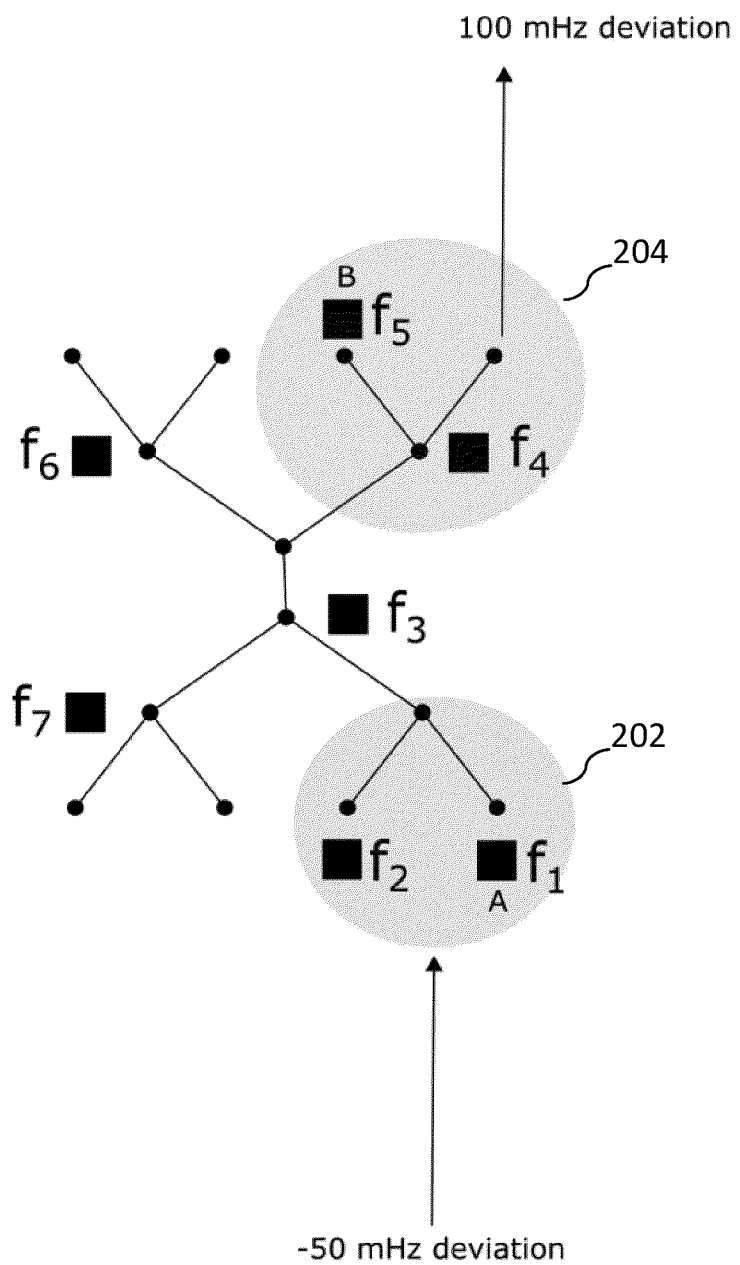
FIG. 2A illustrates a frequency split in an electricity distribution grid.

An example scenario is illustrated in FIG. 2A. In this example, all the assets on the graph are part of the same aggregation pool, asset B being a battery and asset A being an imperfect asset that cannot provide adequate frequency control response standalone (for example because it only covers part of the frequency range, is discrete, too slow, can only actively provide a frequency control response for a limited time period etc.) Assets A and B are thus configured to implement an aggregate response, with each asset's individual response arranged to complement that of the other asset. Following a frequency split event, the grid frequency measured in the grid region 202 comprising asset A (e.g. frequency f1 measured locally to the asset) shows a −50 mHz deviation from the nominal grid frequency (e.g. a frequency of 49.950 Hz), while the grid frequency measured in the grid region 204 comprising asset B (e.g. frequency f5 measured locally to the asset) shows a +100 mHz deviation (e.g. a frequency of 50.100 Hz).

For this example, it is assumed that asset A is a discrete type asset and the battery needs to correct for the remaining imperfections assuming asset A reacts to its local frequency deviation (−50 mHz) resulting in a power flow change of −1 MW. Note in these examples power flow figures are given in terms of power draw from the grid, so that a negative power flow figure corresponds to a reduction of power drawn or an increase in power supply into the grid (in this example −1 MW may correspond to a 1 MW supply into the grid).

Asset B is configured to correct for the ramp rate of Asset A (since asset A will take time to reach its full power adjustment). For example, Asset B can ramp to −1 MW based on the grid frequency deviation as measured at asset A (increasing its supply into the grid), but this results in an action against the frequency deviation at asset B (+100 mHz), which may result in the local grid frequency being pushed even higher. Alternatively, Asset B may determine its response using its own local frequency measurement and ramp up to 3 MW (100 mHz resulting in required +2 MW −1 MW) effectively over-delivering. Both effects are not wanted.

Figure 2B:
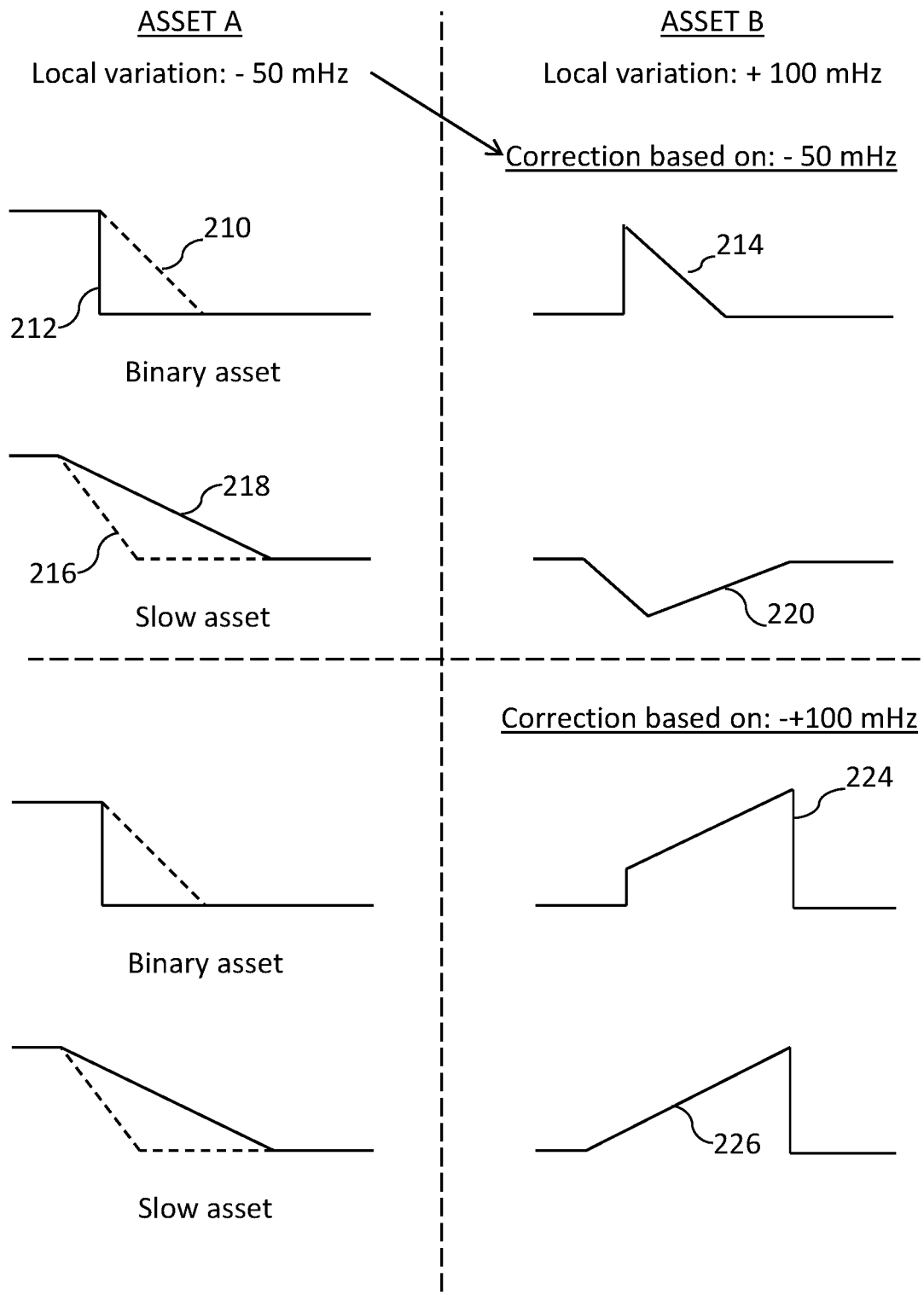
FIG. 2B illustrates examples of frequency control responses during a frequency split.

FIG. 2B illustrates further examples of scenarios based on the frequency split depicted in FIG. 2A (−50 mHz deviation at asset A and +100 mHz deviation at asset B). The first row illustrates the operation of a binary asset with a "perfect" response required for a particular frequency change indicated by line 210 (i.e. the response that would be needed to counter the frequency deviation precisely), and the actual response of the asset indicated by line 212. In this example the binary asset's response is too fast since it switches immediately between its binary output states, and thus compensation is performed by Asset B. The corresponding compensation is shown as line 214. This compensation is based on Asset A's frequency deviation, so as to correct for the difference between required (perfect) response 210 and actual response 212. However, with regard to the local grid frequency at Asset B, this correction is in the right direction but is insufficient to counter the local deviation (100 mHz).

The second row of FIG. 2B shows an actual response 218 for a slow asset, compared to a "perfect" response 216 for the particular frequency deviation occurring at Asset A. In this case, the asset responds more slowly than would be required to counter the deviation. This requires a compensation in the other direction at Asset B. Thus, in this scenario, Asset B again performs its compensation based on the local grid frequency deviation at Asset A. As a result, the compensation 220 performed at Asset B is in the wrong direction relative to the local frequency deviation at Asset B and as such may exacerbate the local deviation.

The third and fourth rows show corresponding responses where Asset B responds based on its own local grid frequency (100 mHz), instead of using Asset A's frequency. In both cases the compensation (224, 226) is in the right direction (relative to the compensation required at Asset A) but is excessive (overdelivery).

Similar problems may arise if the response is based on a frequency measured at the location of a central controller (e.g. f7), where the frequency may correspond to either asset A or asset B's frequency (or may have a third value).

Detecting and Responding to a Frequency Split

In a first approach, the system aims to avoid counterproductive frequency control response actions by assets that could potentially make the situation worse by altering or suspending the frequency control response of one or more aggregated assets when a frequency split condition is detected. To this end, aggregated assets are configured to transmit their local frequency measurements to each other (or to the central controller).

In one example, each asset is configured to measure its local grid frequency and transmit its frequency measurements periodically to each other asset in the aggregation pool. Alternatively, assets may simply broadcast frequency measurements to all other assets in the system. Assets may thus have substantially real-time information on the grid frequency as measured at other assets.

A particular one of the aggregated assets—or possibly each of the aggregated assets—is configured to receive the frequency information from the other asset(s) in the aggregation pool and assess the received frequency measurements from other assets to detect a frequency split. Criteria for detecting a frequency split may include:

The difference between two aggregated assets' local grid frequencies exceeding a threshold.

Two aggregated assets' respective frequencies diverging from the nominal frequency in different directions (i.e. one asset exceeding the nominal frequency, possibly by at least some threshold amount, whilst the other asset falls below the nominal frequency, possibly by at least some threshold amount).

These criteria may also be combined and/or alternative criteria may be used.

Instead of communicating directly with each other, frequency data may be transmitted to a central controller, which may implement the described countermeasures to address the frequency split (e.g. in the FIGS. 1A, 1B approach).

Figure 3:
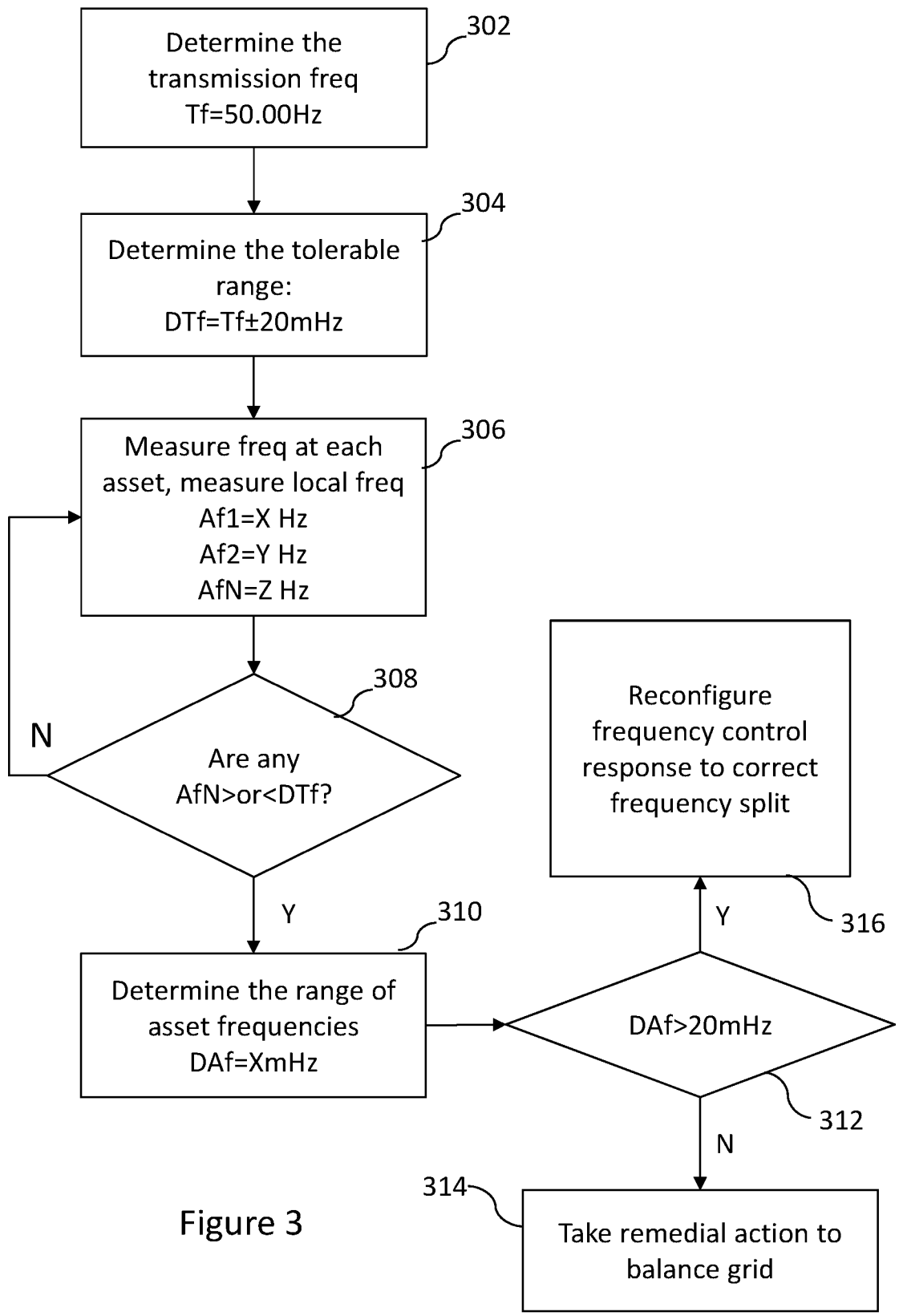
FIG. 3 illustrates a process for detecting a frequency split.

FIG. 3 illustrates one example method for detecting a frequency split condition and triggering corrective measures as implemented at a central control device.

In step 302, the transmission frequency of the grid is determined. This is the nominal or reference frequency at which the grid is intended to operate and may for example be preconfigured at each asset and/or central controller. In this example, the transmission frequency is 50 Hz.

In step 304 a tolerable range of frequency deviation is determined, in this example ±20 mHz. Again, this range may be preconfigured at the assets or central controller. Alternatively, the tolerable range of deviation may be determined automatically by an asset or central controller, depending on circumstances. Such an automatic determination could occur periodically (e.g. based on grid performance over a preceding time window) or the tolerance range could be updated continuously based on current grid performance characteristics.

In step 306, grid frequency measurements are obtained at each asset. The measurements are compared to the acceptable range in step 308 to determine whether any of the asset frequencies lies outside the acceptable range. If not, monitoring continues at step 306. If at least one asset frequency measurement falls outside the acceptable range, then in step 310 the range of the asset frequency measurements is determined, e.g. as the difference between the lowest and highest measured frequencies.

In step 312 the system determines whether the measured frequency difference exceeds some threshold (in this example 20 mHz). If not, the system determines that there is no split. In that case ordinary remedial action may optionally be taken to address the minor frequency fluctuations, as needed (step 314).

If the frequency difference exceeds the threshold, then the system determines that a frequency split has occurred and initiates corrective action in step 316, e.g. by reconfiguring the frequency control response of one or more assets in step 316 to correct or alleviate the split (or avoid exacerbating it). Some strategies for performing such a correction are discussed in the following sections.

Note that the FIG. 3 example is performed by a central controller having access to frequency information from assets in the aggregation pool. However, where assets broadcast frequency information to each other the method could be performed at individual assets. In alternative approaches, it is not necessary to have access to frequency information from all assets. For example, aggregated assets may exchange frequency information directly with each other and detect a split based only on comparing their respective frequencies.

Approach 1—Suspend Frequency Control Response

If a frequency split is detected, then in one approach one or more assets simply cease to provide any frequency control response. Where centralized control is used, a central controller may send a control signal to one more assets to suspend frequency control response. Where assets detect a frequency split autonomously, the asset suspends its own response when it detects a frequency split condition. The asset may continue to monitor the situation and start implementing frequency control response again once the frequency split is no longer detected. The following examples assume that the asset performs the processing and control to suspend frequency control response when needed but the same techniques may be applied to a central controller.

In a variation of the above approach, the asset (or controller) may take further steps to evaluate whether the intended frequency control response is still appropriate in light of the frequency split and either cease frequency control response operation or modify the configured control response if not.

The asset may take the same action in the event that frequency information is not being received from other asset(s) in the aggregation pool, e.g. due to a communication problem. Frequency control response may be suspended until frequency information is received. To avoid a brief communication dropout halting frequency control response, an asset may alternatively continue frequency control response operation based on a predicted frequency determined based on recent frequency measurements (e.g. using the last received frequency measurement, an average of recent measurements, or a forecast based on trends in the frequency measurements).

As a further variation, an asset configured to perform a frequency control response to compensate for limitations in another asset's frequency control response ("compensating asset") may take into account the effect of the compensation based on the local measured grid frequency. In this approach, the compensating asset evaluates its configured response to determine the effect on the local grid state. If the compensation to be applied works against the local state, then the frequency control response is suspended. For example, the compensation may be considered undesirable and hence not be performed if:

- the compensation is in the opposite direction to that required by the local frequency deviation, such that it would cause local grid frequency to deviate further from the nominal value (e.g. a compensation to reduce supply into the grid resulting in lowering of the grid frequency, where the local frequency is already below the nominal value, or vice versa).
- the level of compensation is too high so that it works against the local state. Overdelivery may be permissible within a determined range but outside that range frequency control response is suspended.

In the above examples, instead of completely ceasing the configured response for an asset, the response level (power increase/decrease) may be increased or reduced to mitigate the effect on the local grid frequency.

Approach 2—Dynamic Clustering

A second approach involves, in response to detection of the frequency split, clustering the assets in the aggregation pool into sub-clusters according to their respective locally measured grid frequency.

Specifically, assets having a similar locally measured grid frequency (or equivalently a similar frequency deviation from the nominal value) are assigned to a cluster. Typically such assets might be expected to be located in the same region of the grid (geographically or topologically) though this is not necessary. Aggregation is then performed independently over these sub-clusters (using the same aggregation techniques and policies as during normal operation).

Figure 4A:
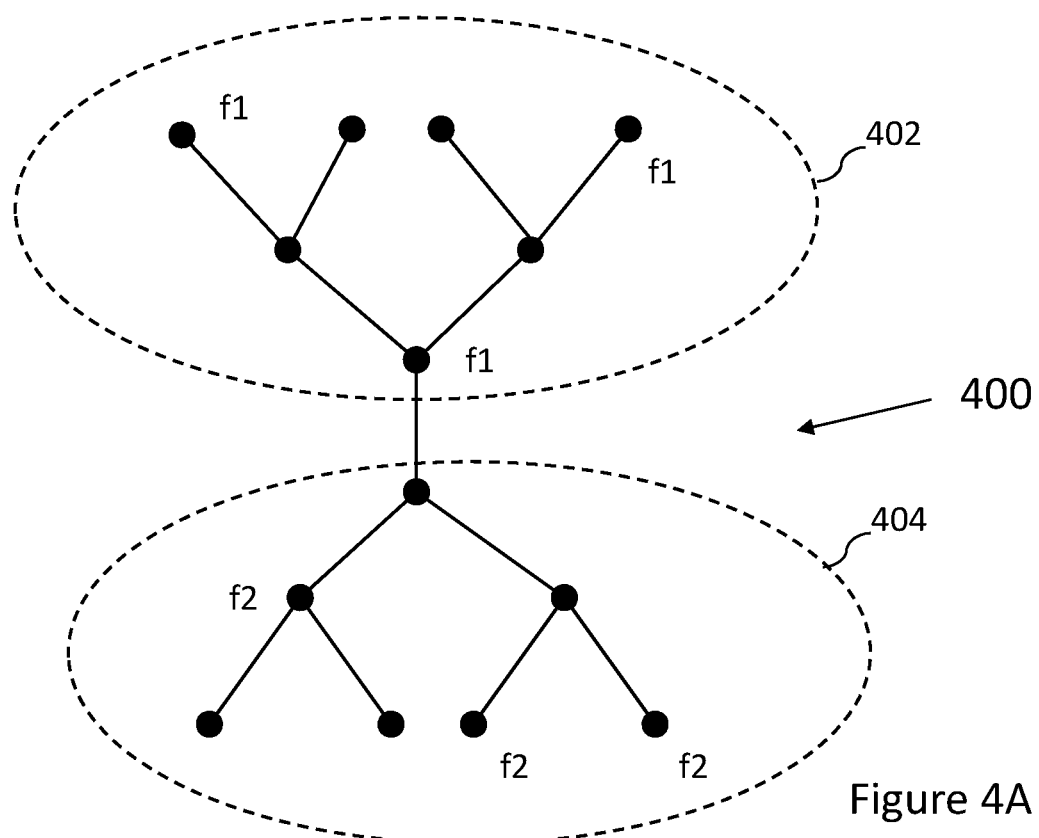
FIG. 4A illustrates clustering assets into frequency domains.

An example is illustrated in FIG. 4A, which shows the grid 400 divided into a first sub-cluster 402 comprising assets having a common frequency f1 and a second sub cluster 404 comprising assets with a second common frequency f2. Note that it is not required that the assets in a cluster should have exactly the same frequency but rather, clustering may be performed so that assets with approximately the same frequency are placed in a cluster (e.g. such that assets within a cluster are closer in frequency to each other than they are to assets in other clusters). As a result of the clustering, the asset pool (and grid) is effectively subdivided into a set of frequency domains, in which aggregation can be performed independently for each frequency domain without causing the described undesired consequences.

Figure 4B:
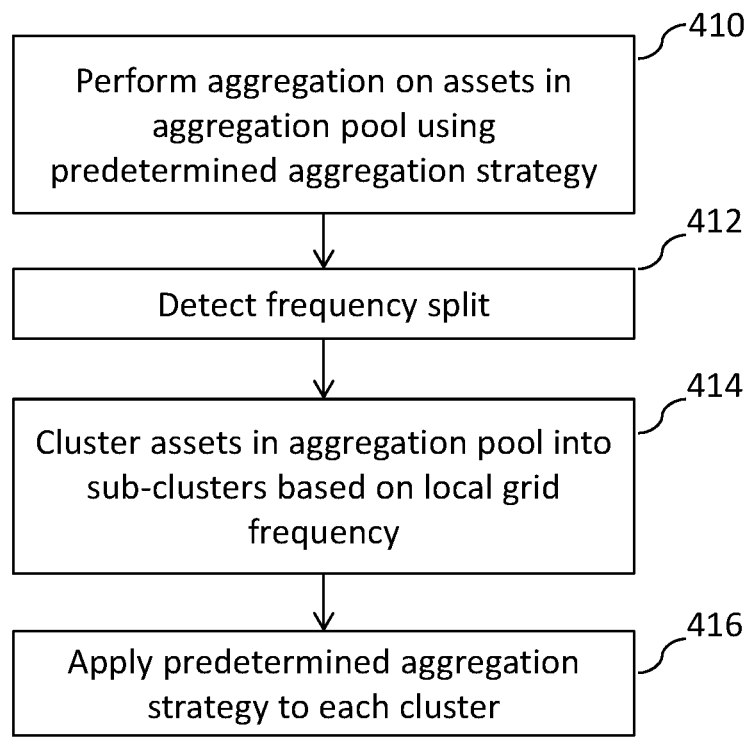
FIG. 4B illustrates a process for clustering assets and performing aggregation based on asset clusters.

The process is summarized in FIG. 4B. In step 410, during normal operation (prior to detection of a frequency split), frequency control response aggregation is applied to assets in the asset pool using a predetermined aggregation strategy, algorithm or policy. In step 412, a frequency split is detected. In step 414, a clustering algorithm is applied to the assets in the pool based on grid frequency to determine at least two asset clusters. In step 416, the predetermined aggregation strategy, algorithm or policy is applied independently to each cluster of assets. Aggregated frequency control response may thus still be performed, but only assets within a cluster will be used to form aggregated asset groups, e.g. to compensate for respective limitations in demand response. As a result, assets in different frequency domains will no longer be aggregated to provide an aggregate response.

Grid topology may additionally be taken into account in the clustering. For example, clustering may be guided by specific connectivity within the grid, e.g. in case there is knowledge of a severed connection.

Figure 5:
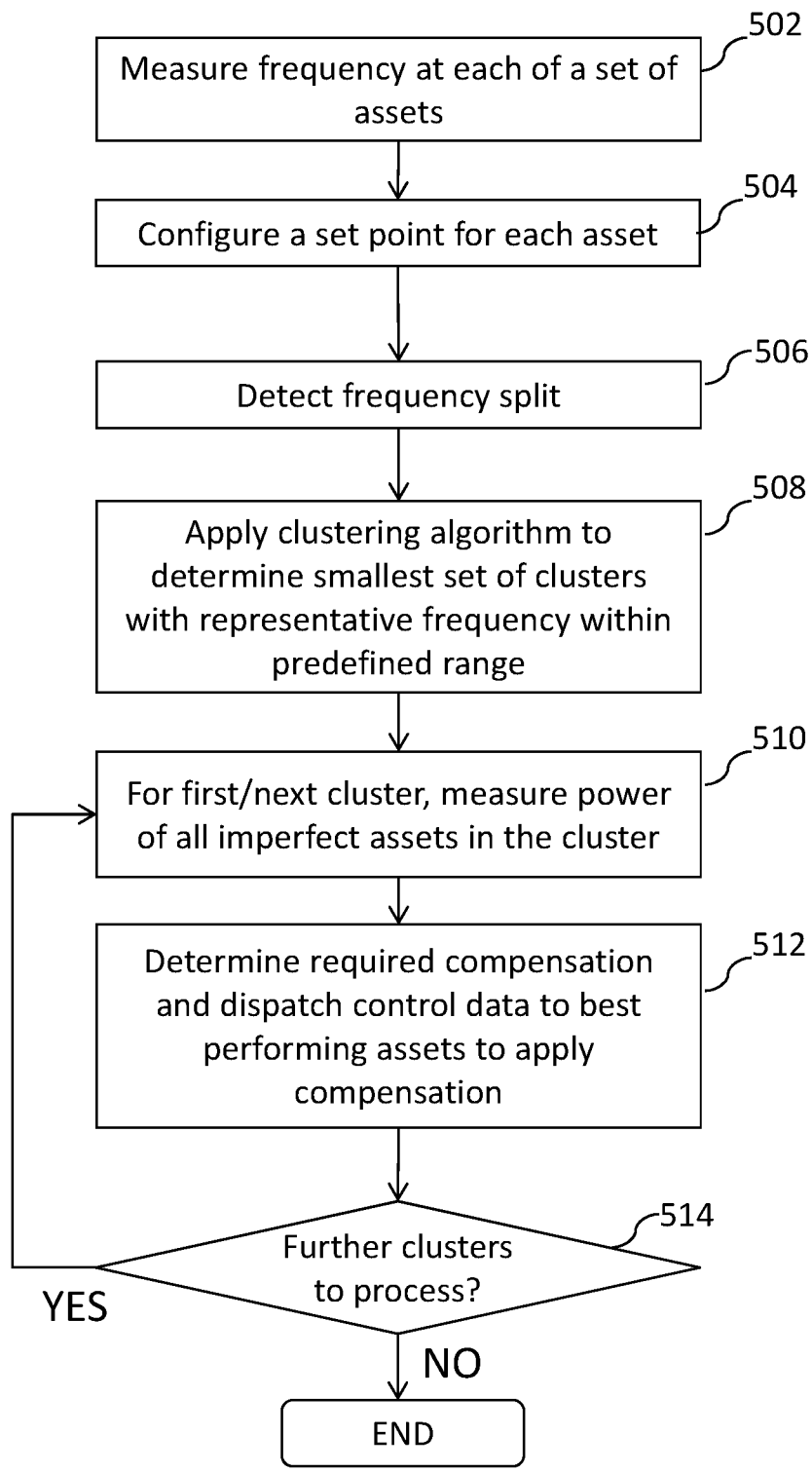
FIG. 5 illustrates a process for configuring a frequency control response when using a centralized real-time control approach.

FIG. 5 further illustrates an example of the clustering approach applied in the case of the centralized real-time control model (as described in relation to FIG. 1A).

In step 502 the frequency is measured at each of a set of assets A, containing assets $a_i \in A$, providing a respective frequency measurement $f_i$ [Hz]. In step 504, a frequency set-point $f_i^s$ is determined for each asset and the respective asset is configured accordingly. The frequency set-point determines a power output change responsive to frequency deviation. The power output change by an asset is directly coupled to the frequency deviation (for example, for a grid frequency of 50 Hz, no power change is required relative to a baseline supply/consumption, with adjustments relative to that baseline performed in the case of frequency deviation;

e.g. a power plant running at 1 MW can change its output power relative to this 1 MW).

In step 506, a frequency split is detected (for example using the previously described techniques).

In response, in step 508, a clustering algorithm is applied to determine the smallest set of distinct clusters $A_j$ ($\Sigma A_j = A$) with respective reference frequency $f_j$ (e.g. mean frequency for the cluster), such that all assets in a cluster $A_j$ measure a frequency that is within a pre-defined range from $f_j$, i.e. $\forall a_i \in A_j: |f_i - f_j| < \Delta f_{max}$ (where $\Delta f_{max}$ specifies the maximum frequency deviation from the cluster's reference frequency $f_j$ and hence the allowable frequency range for a cluster).

In one example, the clustering algorithm used is a k-means clustering algorithm, but any suitable clustering algorithm may be used. For example, a simple clustering technique could assume that the grid has been divided into two frequency domains by the frequency split event, and thus cluster assets into two clusters, e.g. based on comparing their local frequency to a median or average frequency value for all assets.

Steps 510-514 are repeated for each asset cluster. In step 510, for the first (or on subsequent iterations, next) cluster $A_j$, the power supply/consumption of all imperfect assets in the cluster is measured: $\Sigma_{i \in A_j} p_i | a_i \neq \text{perfect}$ The required compensation for the imperfect assets is then determined in step 512. This may be achieved by determining the difference between the power achieved by the imperfect assets and perfect delivery, i.e. $p_j(<f_j> - <f_j^s>)$ (where $<..>$ indicates mean value). The determined compensation is then dispatched to the best performing assets (i.e. those assets that are able to respond quickly and/or accurately to their set points, e.g. batteries). If more than one asset is available to perform compensation, then the required compensation may be shared based on any appropriate criteria and heuristics (e.g. based on past compensation performed).

If there are further clusters to process (514) then the process continues at step 510 for the next cluster; otherwise, the process ends. Note however, that in practice, if the frequency split persists, then frequency control response may continue to be performed periodically (e.g. by repeating the loop 510-514 periodically).

Figure 6:
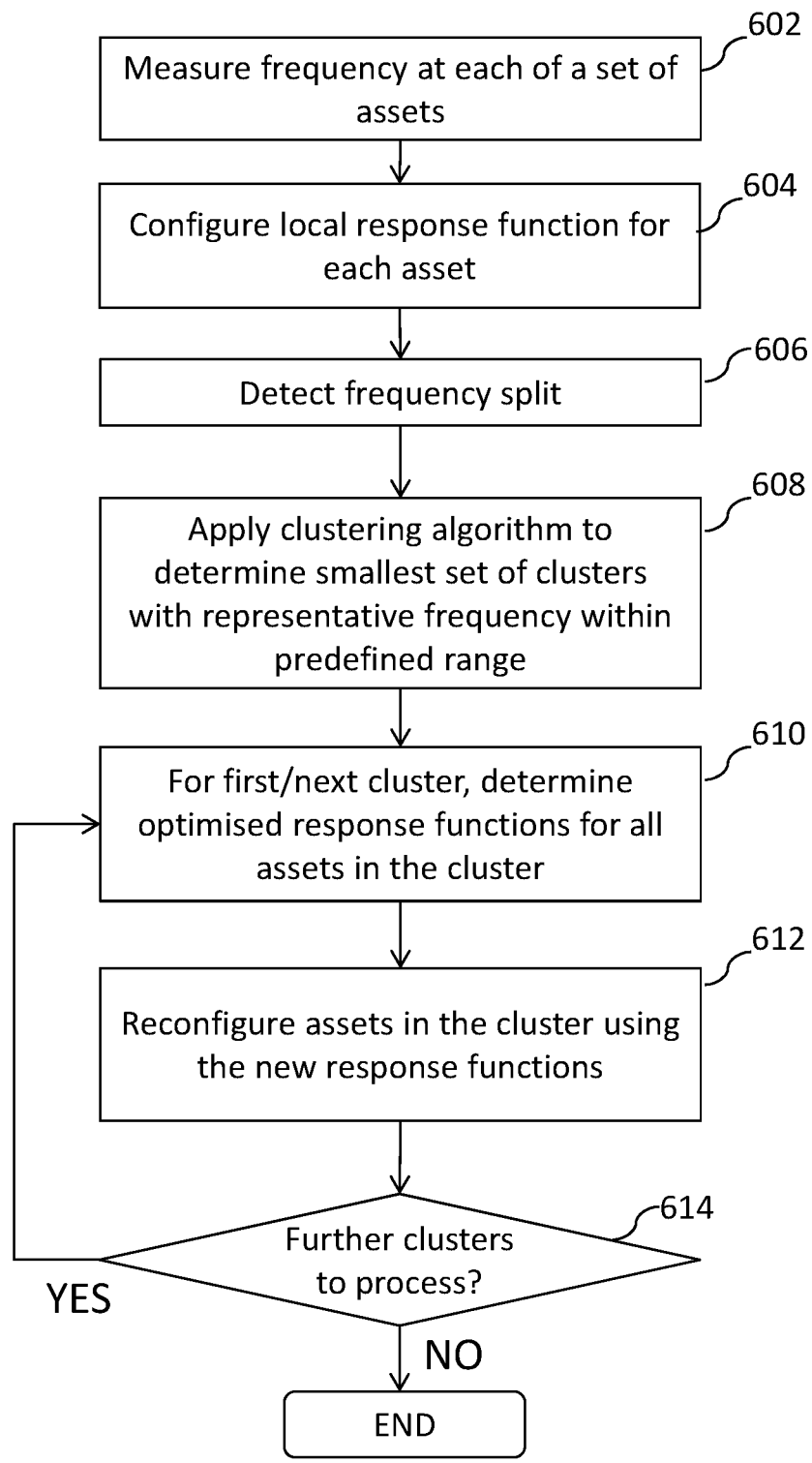
FIG. 6 illustrates a process for configuring a frequency control response when using a hybrid control approach.

FIG. 6 illustrates the clustering approach when applied to the hybrid control model (as described in relation to FIG. 1B).

The hybrid approach in some embodiments may react to locally measured frequency with aggregation configured to adequately cover the range of expected frequency deviations, but without compensating for technical limitations (e.g. ramp speed) of assets (beyond possibly responding to assets becoming unavailable entirely). That approach may be more robust in the sense that it may not make the situation worse. Nevertheless, the clustering approach can still be beneficial in case of a frequency split by identifying clusters with the same frequency and applying aggregation over these different sub-clusters.

In step 602, the frequency is measured at each of a set of assets A, containing assets $a_i \in A$, providing a respective frequency measurement $f_i$ [Hz]. In step 604, a local response function is determined for each asset and the respective asset is configured accordingly.

In step 606, a frequency split is detected (e.g. using previously described techniques).

In response, in step 608, a clustering algorithm is applied to determine a set of asset clusters. Clustering is performed as described in the previous example.

Steps 610-614 are repeated for each asset cluster. In step 610, the system determines revised response functions for all assets $g_j(f_j - f_j^s, \theta)$. This may use the approach described in WO 2015/059544. For example:

$$\min_{\theta_i, \ldots, |A_j|} (\Sigma g_i(f_i - f_i^s, \theta_i) - p_j(<f_j> - <f_j^s>))^2$$

The revised response functions aggregate only over assets within the cluster to provide aggregated responses involving assets within the same frequency domain. In step 612 the assets are reconfigured to use the revised response functions. The process repeats (614) while there are further clusters to process. Once all clusters have been processed, the process ends.

Remedial Action in the Case of Self-Organizing Frequency Control Response

In the distributed self-organizing approach (as described above in relation to FIG. 1C), assets interact without having a real-time data link by exchanging models, making them more resilient against communications failures. Although this works reliably while the grid frequency remains homogenous, similar problems can occur in the case of frequency split, in terms of which frequency to plug into the local model. For example, in the FIG. 2A scenario, if the local frequency asset A is doing +2 MW (effectively doing −1 MW) and the asset B is compensating for this by delivering −1 MW since from its perspective it appears as if together they need to deliver +1 MW, which in this case would work against the system. More generally, the possible problem scenarios in the case of self-organizing frequency control response are essentially the same as those described in relation to FIGS. 2A-2B, but unlike with centralized control, control occurs autonomously at the assets.

In such a system the above-described techniques may be applied as follows.

Frequency control response may be terminated as per approach 1 in response to explicit detection of a frequency response, based on cooperating assets exchanging (or broadcasting) frequency measurements. Thus, if an asset receives a frequency measurement from another asset with which it is cooperating to provide an aggregate frequency control response which differs (e.g. by more than a threshold tolerance) from the local grid frequency, then the asset suspends the frequency control response. Alternatively, a given asset may decide to stop providing a frequency control response in case of significant model errors. To achieve this, the asset may continuously check the model accuracy against the locally measured grid frequency and in case of a significant difference the coordinated response is halted.

Figure 7:
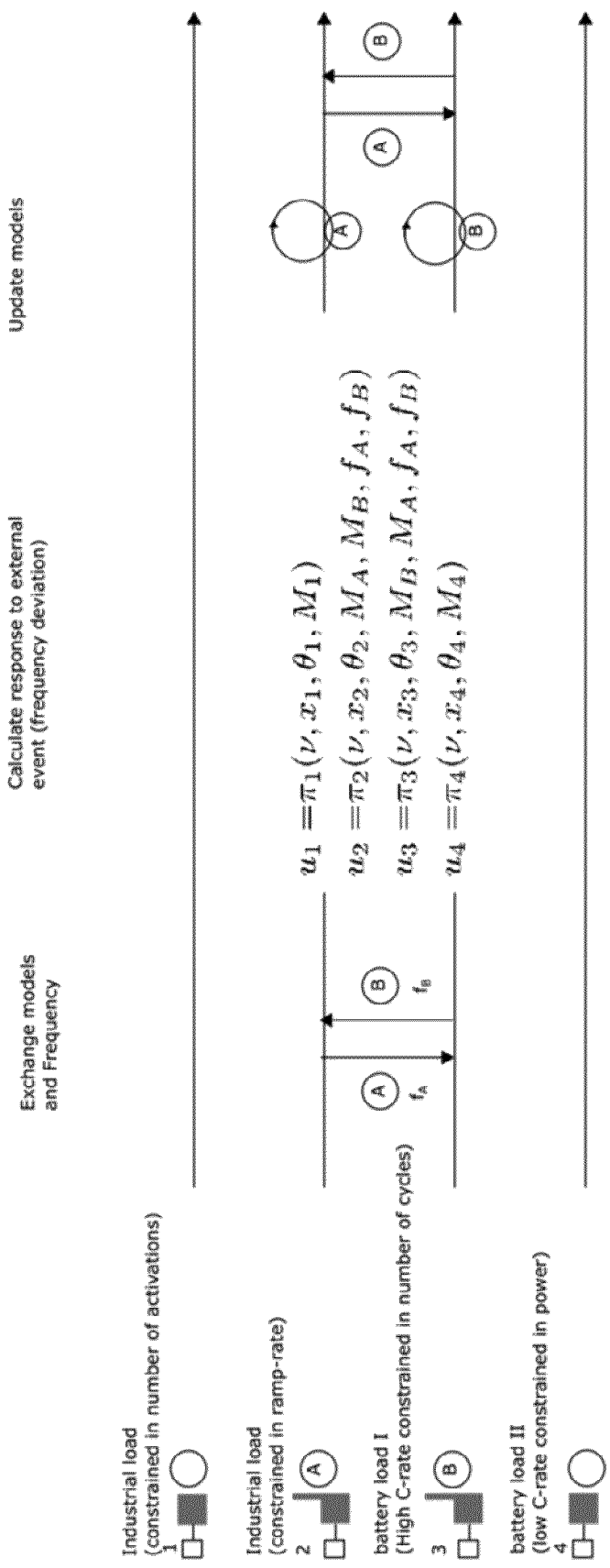
FIG. 7 schematically illustrates modification of a frequency control response in the case of a distributed self-organising control approach.

In a further approach, assets may continuously exchange frequency measurements as discussed above, and update their stored models based on the information if necessary. This is illustrated in FIG. 7, which shows a set of four assets, of which two (identified as A and B) are cooperating to provide complementary, aggregated frequency control response. Time flows from left to right as shown by the arrows in the diagram. Initially, the assets exchange their respective models and frequency data. Then, a frequency split is detected and each asset calculates the necessary response. Finally, each asset updates its local model and the updated models are exchanged. The assets then continue operation based on the updated models.

In a variation of this approach, the assets may also trigger renegotiation of cooperation in response to changes or divergences in frequency. When negotiating cooperation, an asset may refuse to work with another asset having an incompatible grid frequency, e.g. where a frequency difference between the two assets exceeds a threshold tolerance and/or where the assets' respective frequency deviations are in a different direction with respect to the nominal grid frequency (e.g. above and below nominal value respectively).

This approach effectively leads to an implicit segmentation of the assets into separate frequency domains, since assets in different frequency domains existing after a frequency split will not cooperate to provide aggregate frequency control responses (and will cease aggregate frequency control responses if they had previously been doing so). This implicit segmentation arises naturally through the self-organizing control principle, producing a similar result to the explicit clustering described in previous examples.

Figure 8:
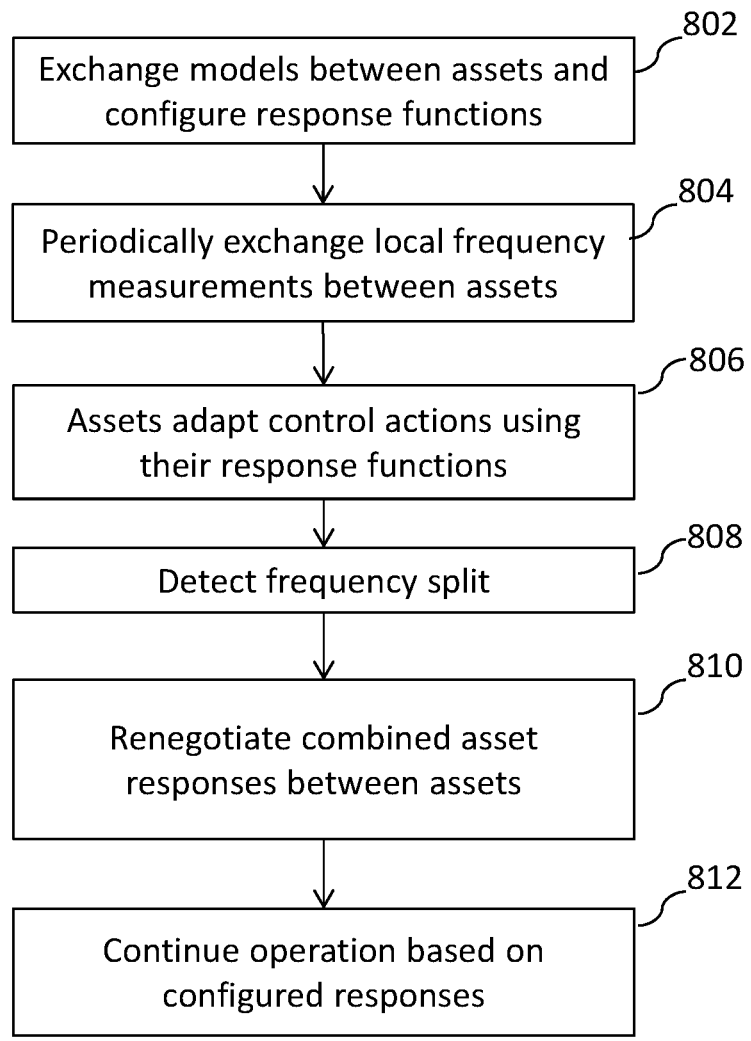
FIG. 8 is a process diagram further illustrating a process for adapting a frequency control response in the case of a distributed self-organising control approach.

The process is summarized in FIG. 8. In step 802, assets exchange models, negotiate formation of aggregate asset groups to perform aggregate frequency control responses, and configure their local response functions. During subsequent operation, assets periodically exchange frequency measurements (step 804), whilst implementing frequency control response based on the exchanged models and locally measured grid frequencies (step 806). This involves adapting their control actions based on their configured response function, noting that their response function may utilize the frequency of the other asset(s) in an aggregation group (as indicated in FIG. 7 where $\pi(\ldots, f_A, f_B)$ indicates that the control policy uses the frequency of the other asset(s) in addition to the locally measured frequency). Thus steps 804 and 806 typically occur in parallel.

In step 808, assets detect a frequency split. In step 810, assets renegotiate aggregate frequency control responses based on the knowledge of the grid frequencies measured at other assets, for example by preferentially (or exclusively) forming aggregated asset groups with assets having similar or identical grid frequencies (e.g. having the same grid frequencies to within a defined tolerance). During renegotiation, assets may update their models for other assets if they are no longer accurate. In step 812, the assets continue regular frequency control response operations based on the revised models and the re-configured frequency control responses and aggregation groups.

Note that in this approach assets may in any case perform periodic renegotiation of aggregated frequency control responses, and so response to a frequency split may occur naturally based on using the grid frequency differences as part of the negotiation policies. Similarly, assets will naturally reconfigure responses and asset groupings (e.g. returning to their original configuration) when the frequency split ends. Alternatively or additionally, detection of frequency split or other sudden frequency deviations/abnormalities may serve as an explicit trigger for renegotiation of aggregation groups.

Clustering could alternatively be performed explicitly, using clustering techniques described previously. For example a central controller may perform the clustering and configure each asset with a cluster membership. Assets then renegotiate their coordinated frequency control responses but cooperating only with assets in the same assigned cluster. The clustering could also be performed autonomously by each asset. On the assumption that assets broadcast their local frequency measurements to other assets, each asset would have the frequency information necessary to perform the clustering and should be expected to arrive at the same outcome regarding cluster memberships. As a further variation, a particular asset detecting the frequency split may perform clustering and distribute the results to other assets.

The above approaches have in common that they involve preventing aggregated, complementary frequency control response (whether through external coordination or direct cooperation) between assets that exist in different frequency domains after a frequency split. Described approaches thus may involve:

suspending the aggregated response explicitly (unilaterally by an asset or in a coordinated fashion by a central controller);

segmenting the available assets into clusters corresponding to different frequency domains, and then applying aggregation only within those clusters so that assets in different clusters (frequency domains) no longer operate in aggregated fashion; or allowing dynamic self-organization of assets taking frequency disparities into account.

However, other approaches to preventing, limiting or altering coordinated demand response for frequency control may be used.

In each of the approaches, the system may revert to normal operation after a detected frequency split ends. For example, this may occur when the frequency difference between locations of the grid falls below some tolerance threshold (this could be the same threshold used when detecting the split or a different threshold could be used). The controller and/or assets may then return to their configuration prior to the split (for example the controller and/or assets may have stored prior aggregation group configurations, local response functions etc.) Alternatively, the relevant aggregation algorithm may be re-run in order to reconfigure aggregated responses in the absence of the frequency split (e.g. in the distributed self-organizing approach, assets may renegotiate with each other to configure new aggregate responses). The assets can then continue to provide frequency control response as normal in response to minor frequency fluctuations, until another frequency split event occurs.

Control Devices

Figure 9:
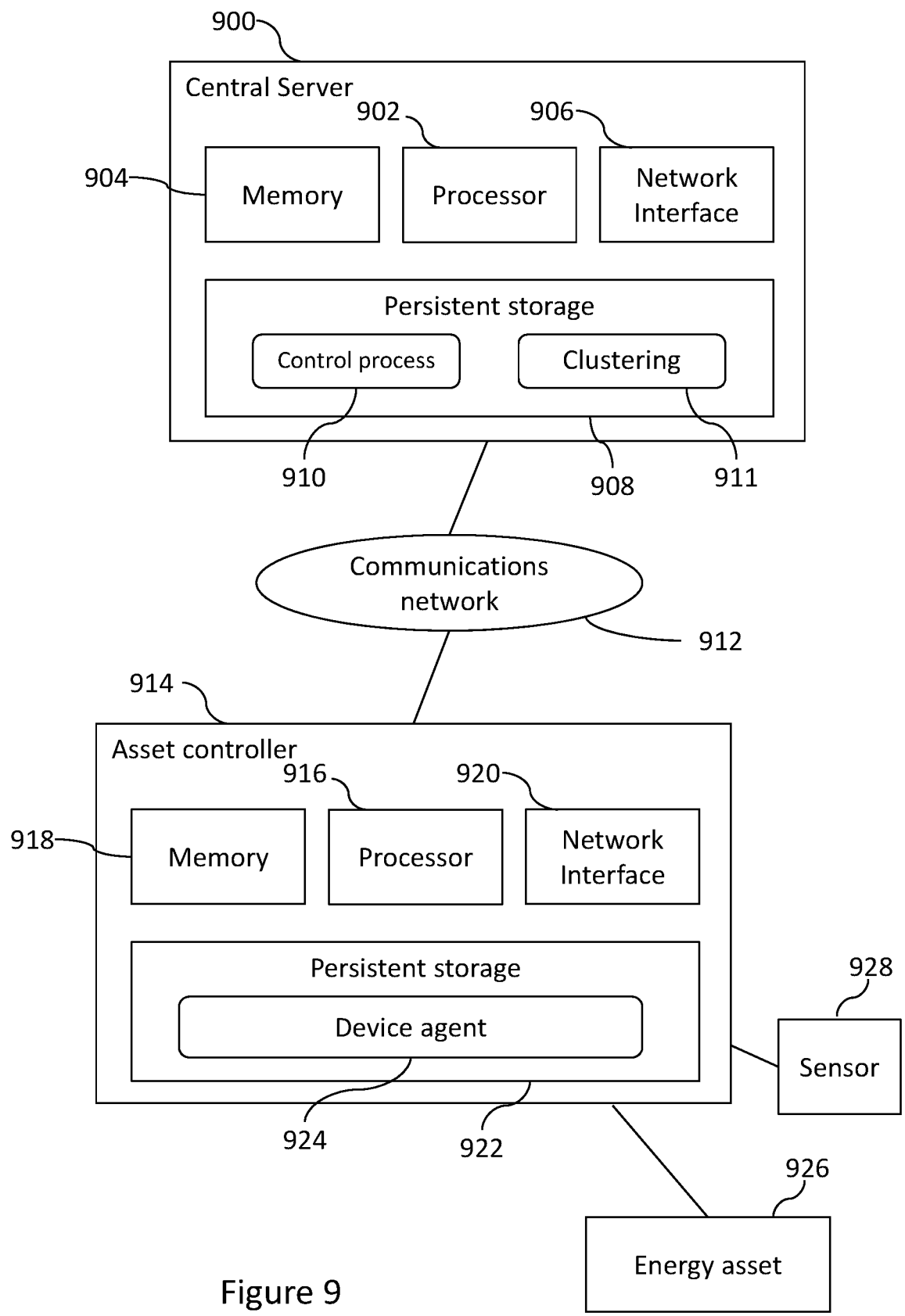
FIG. 9 illustrates a central control device and an asset controller for use in described methods.

FIG. 9 illustrates the hardware and software architecture of components of the described system. A central server 900 may be provided to act as a central controller (e.g. in the FIGS. 1A/1B approaches). The server includes one or more processors 902 together with volatile/random access memory 904 for storing temporary data and software code being executed.

A network interface 906 (e.g. a wired or wireless interface) is provided for communication with other system components including energy assets over one or more communications networks 912 (e.g. Local or Wide Area Networks, including the Internet).

Persistent storage 908 (e.g. in the form of hard disk storage, optical storage and the like) persistently stores software for performing described functions, including a control process 910 for performing centralized control (as in the FIGS. 1A/1B examples), including computation of set points or local response functions for assets. A clustering process 911 implements described clustering algorithms for segmenting the asset pool into clusters in the case of a frequency split, in which case the control process 910 operates independently for each cluster (as an example a respective parallel control process or thread could be run for each cluster). The persistent storage also includes other server software and data (not shown), such as a server operating system.

The server will include other conventional hardware and software components as known to those skilled in the art, and the components are interconnected by a data bus (this may in practice consist of several distinct buses such as a memory bus and I/O bus).

As asset controller 914 is provided in the form of a computing device for controlling an energy asset 926 (e.g. a battery or other energy supplying asset or an industrial load or other energy consuming asset). The asset controller 914 is connected to the communications network 912 using a network interface 920 (e.g. a wired or wireless interface) to allow communication with the central controller. The asset controller is also connected to one or more grid sensors 928 for detecting grid frequency locally to the asset (and possibly other grid operating characteristics).

The asset controller includes one or more processors 916 together with volatile/random access memory 918 for storing temporary data and software code being executed (e.g. an embedded microprocessor such as an ARM Cortex CPU with associated RAM may be used).

Persistent storage 922 (e.g. in the form of hard disk storage, optical storage, solid-state storage or FLASH memory and the like) persistently stores software for performing described functions of the asset controller, including a device agent 924 implementing demand response/frequency control response based on any of the described techniques, for example based on remote set points, a locally stored response function, models and other information exchanged with other asset controllers, etc. In the case of the self-organizing control approach, the device agent further performs the negotiation with other asset controllers to determine coordinated frequency control response strategies as described. Necessary control parameters, set points, response functions, asset models etc. may additionally be stored in the memory 918 and/or persistent storage 922 for use by the asset controller/device agent. The asset controller may include other conventional hardware/software elements as known to the skilled person.

Typically, the system will include multiple such asset controllers 914 associated with various assets in the grid, connected to and able to communicate with each other and/or with the central server 900 via communications network 912. Each managed asset in the asset pool may be associated with a respective asset controller. In some cases, a single asset controller may serve multiple assets. In systems without a central controller, the central server 900 may be omitted.

While a specific architecture is shown by way of example, any appropriate hardware/software architecture may be employed.

Furthermore, functional components indicated as separate may be combined and vice versa. For example, the functions of server 900 may in practice be implemented by multiple separate server devices (e.g. control process 910 and clustering process 911 could run on different servers, or different servers could control different asset clusters or grid regions). In another example, the functions of the central server could be integrated into a selected asset controller.

It will be understood that the present invention has been described above purely by way of example, and modification of detail can be made within the scope of the invention.

The invention claimed is:

1. A method of controlling assets connected to an electricity distribution grid operating at a predetermined grid frequency, the assets comprising assets arranged to supply electrical energy to and/or consume electrical energy from the electricity distribution grid, wherein at least some of the assets are configurable to adjust energy flow to or from the electricity distribution grid to counteract grid frequency fluctuations, the method comprising:

configuring an aggregate response by a group of assets to fluctuations in grid frequency, wherein the aggregate response comprises respective adjustments of energy flow between each of the group of assets and the electricity distribution grid, the adjustments arranged in combination to counteract the fluctuations in the grid frequency;

detecting a divergence between:
  a first grid frequency measured in a portion of the electricity distribution grid comprising a first asset of the group of assets; and
  a second grid frequency measured in a portion of the electricity distribution grid comprising a second asset of the group of assets; and in response to detecting the divergence, reconfiguring at least one of the first and second assets to cease, or modify a magnitude of the configured energy flow adjustment for that asset to alleviate, or avoid exacerbating the divergence between the first grid frequency and the second grid frequency.

2. The method according to claim 1, wherein the reconfiguring step comprises configuring one or more of the group of assets to cease providing its configured energy flow adjustment.

3. The method according to claim 1, comprising, for a given one of the group of assets configured to implement a given energy flow adjustment, determining a local grid frequency associated with the given asset, evaluating an expected effect of the given energy flow adjustment on the local grid frequency, and ceasing or altering provision of the given energy flow adjustment in dependence on the evaluation.

4. The method according to claim 3, comprising ceasing provision of the given energy flow adjustment in response to determining that the energy flow adjustment would exacerbate the detected divergence between the first grid frequency and the second grid frequency.

5. The method according to claim 3, comprising ceasing provision of the given energy flow adjustment in response to determining that the energy flow adjustment would cause or exacerbate a deviation of the local grid frequency from the predetermined grid frequency, optionally in response to determining that:
  the energy flow adjustment would lower the local grid frequency and the local grid frequency is already below the predetermined grid frequency; or
  the energy flow adjustment would raise the local grid frequency and the local grid frequency is already above the predetermined grid frequency.

6. The method according to claim 3, comprising ceasing provision of the given energy flow adjustment in response to determining that the energy flow adjustment would cause an adjustment of the local grid frequency that exceeds a required correction of the local grid frequency, optionally by a threshold margin.

7. The method according to claim 1, comprising reverting configuration of the assets to the configured aggregate response in response to detecting that the divergence between the first grid frequency and the second grid frequency has ceased or that a magnitude of the divergence between the first grid frequency and the second grid frequency has fallen below a threshold.

8. The method according to claim 1, wherein the aggregate response is configured based on applying an aggregation algorithm to a pool of assets, the method comprising, in response to detecting the divergence between the first grid frequency and the second grid frequency:

segmenting the pool of assets into a plurality of asset clusters in dependence on respective grid frequencies measured for respective assets of the pool of assets; and for each asset cluster, applying the aggregation algorithm to assets within the cluster to configure one or more aggregate responses involving only one or more assets within the cluster.

9. The method according to claim 1, wherein the detecting step is performed by at least one of the assets.

10. The method according to claim 9, wherein the detecting step is performed by at least one asset of the group of assets based on:

a local grid frequency measured at the at least one asset; and a grid frequency measurement received at the at least one asset from another one of the assets in the group of assets.

11. The method according to claim 1, wherein the detecting is performed by a central controller, optionally based on grid frequency measurements obtained from assets or based on a central grid frequency measurement, wherein the grid frequency measurements are optionally performed locally to the controller.

12. The method according to claim 1, wherein the detecting the divergence between the first grid frequency and the second grid frequency comprises one or both of:

detecting a difference between the first grid frequency and the second grid frequency, such that the difference exceeds a threshold difference; and detecting one of the first and second grid frequencies falling below the predetermined grid frequency, optionally by at least a predetermined threshold amount and detecting the other of the first and second grid frequencies exceeding the predetermined grid frequency, optionally by at least the predetermined threshold amount.

13. The method according to claim 1, wherein the assets configured to provide the aggregate response are configured to provide different but complementary energy flow adjustments in order to achieve a predetermined combined response arranged to counteract the grid frequency fluctuation.

14. The method according to claim 1, wherein the configuring step comprises identifying two or more assets having complementary power response characteristics and selecting the identified assets to provide the aggregated response.

15. The method according to claim 1, wherein the assets configured to provide the aggregate response comprise assets having different response characteristics for responding to frequency fluctuations by adjusting energy flow, the different response characteristics optionally comprising one or more of:

different power draw or power supply capabilities;

different capabilities for increasing or reducing energy flow responsive to frequency fluctuations;

different response times for achieving an energy flow adjustment;

different ramp rates for an energy flow adjustment;

different time periods during which the assets are able to provide an energy flow adjustment;

different asset types, optionally including:

a discrete asset type configurable to selectively operate in one of a plurality of discrete states including an off state in which no power is provided or consumed and one or more active states each providing a respective predetermined power supply or consumption level and;

a continuous asset type configurable to provide a continuously variable level of power supply or consumption, optionally linearly variable with respect to a frequency deviation to be corrected.

16. The method according to claim 1, wherein configuration of one or more aggregate responses and/or segmentation into asset clusters is performed:

by a central controller, or by one or more of the group of assets, optionally wherein configuration of one or more aggregate responses is performed cooperatively by assets in the group of assets in response to exchanging data between the assets, the exchanged data comprising operating models of the assets.

17. The method according to claim 1, wherein configuration of one or more aggregate responses comprises negotiation between assets to determine an asset group suitable for providing an aggregate response, and configuring the aggregate response by the assets of the asset group based on information exchanged between the assets of the asset group.

18. The method according to claim 17, comprising exchanging grid frequency information between the assets, the negotiation performed in dependence on the grid frequency information.

19. The method according to claim 18, wherein the assets having grid frequencies that diverge, optionally beyond a threshold difference, are configured not to form an asset group for providing the aggregate response.

20. The method according to claim 17, comprising ceasing or altering cooperation between assets in the group and/or triggering renegotiation of asset groups in response to detection of a grid frequency divergence in the electricity distribution grid or between the assets of the group.

21. The method according to claim 1, wherein the aggregate response is configured by a central controller substantially in real-time responsive to grid frequency measurements received at the central controller.

22. The method according to claim 1, wherein the aggregate response is configured in advance of the divergence between the first grid frequency and the second grid frequency by configuring each asset in the group with control parameters specifying a respective required response, by a central controller.

23. The method according to claim 22, wherein each asset in the group performs energy flow adjustment in accordance with the aggregate response configured in advance of the divergence between the first grid frequency and the second grid frequency autonomously after configuration in response to detecting frequency fluctuations, based on a local grid frequency measured at or locally to the asset, optionally wherein the aggregate response configured in advance comprises a response function specifying an energy flow adjustment in dependence on a measured frequency variation.

24. A method of controlling a pool of assets connected to an electricity distribution grid operating at a predetermined grid frequency, the pool of assets comprising assets arranged to supply electrical energy to and/or consume electrical energy from the electricity distribution grid, wherein at least some of the assets are configurable to adjust energy flow to or from the electricity distribution grid to counteract grid frequency fluctuations, the method comprising:

applying an aggregation algorithm to the assets in the pool to configure one or more first aggregate responses to fluctuations in grid frequency, wherein an aggregate response comprises respective adjustments of energy flow between each of a selected group of assets and the electricity distribution grid, the adjustments arranged in combination to counteract a fluctuation in the grid frequency;

controlling assets in the pool in accordance with the configured one or more first aggregate responses during a first time;

detecting a divergence between first and second grid frequencies measured at different locations of the electricity distribution grid; and in response to detecting the divergence:
  segmenting the pool of assets into a plurality of asset clusters in dependence on respective grid frequencies measured for respective assets of the pool; and
  for each asset cluster, applying the aggregation algorithm to assets within the cluster to configure one or more second aggregate responses involving only one or more of the assets within the cluster;

the method further comprising controlling the one or more assets in each asset cluster in accordance with the respective configured second aggregate responses during a second time.

25. The method according to claim 24, wherein the segmenting the pool of assets into the plurality of asset clusters in dependence on the respective grid frequencies comprises:
  for each of a plurality of assets in the pool, determining a local grid frequency for the asset;
  assigning each of the plurality of assets to an asset cluster in dependency on its local grid frequency.

26. The method according to claim 24, comprising segmenting the assets by one or more of:
  assigning assets with similar local grid frequencies to same cluster;
  assigning assets having local grid frequencies within a defined range of each other and/or of a reference frequency to the same cluster;
  assigning assets to clusters such that assets within a cluster have grid frequencies closer to each other than to the electricity distribution grid frequencies of assets in other clusters.

27. The method according to claim 24, wherein the segmenting is performed using a clustering algorithm, optionally wherein the clustering algorithm is a k-means clustering algorithm.

28. A tangible non-transitory computer-readable medium comprising software code adapted, when executed on one or more data processing devices, to perform a method of correcting a grid frequency imbalance in an electricity supply grid, comprising:
  configuring an aggregate response by a group of energy assets to fluctuations in grid frequency, wherein the aggregate response comprises respective adjustments of energy flow between each of the group of energy assets and the electricity supply grid, the adjustments arranged in combination to counteract a fluctuation in the grid frequency;
  detecting a divergence between:
    a first grid frequency measured in a portion of the electricity supply grid comprising a first asset of the group of energy assets; and
    a second grid frequency measured in a portion of the electricity supply grid comprising a second asset of the group of energy assets; and
  in response to detecting the divergence, reconfiguring at least one of the first and second assets to cease, or modify a magnitude of the configured energy flow adjustment for that asset to alleviate, or avoid exacerbating the divergence between the first grid frequency and the second grid frequency.

29. A control system comprising:
at least one processor;
at least first and second grid frequency sensors for sensing respective first and second transmission frequencies of electricity at different locations of an electricity distribution grid;
a control interface for controlling an energy supplying or energy consuming asset connected to the electricity distribution grid;
wherein the at least one processor is arranged to:
configure an aggregate response of a group of energy supplying and/or energy consuming assets to fluctuations in grid frequency, wherein the aggregate response comprises respective adjustments of energy flow between each of the group of energy supplying and/or energy consuming assets and the electricity distribution grid, the adjustments arranged in combination to counteract a fluctuation in the grid frequency;
  detect a divergence between a first grid frequency measurement received from the first grid frequency sensor and a second grid frequency measurement received from the second grid frequency sensor; and
  in response to detecting the divergence, altering or suspending control of at least one of the energy supplying and/or energy consuming assets in the group to alleviate or avoid exacerbating the divergence.

* * * * *